United States Patent
Zhao et al.

(10) Patent No.: US 12,369,183 B2
(45) Date of Patent: Jul. 22, 2025

(54) INFORMATION SENDING METHOD AND APPARATUS, INFORMATION RECEIVING METHOD AND APPARATUS, AND DEVICE AND STORAGE MEDIUM

(71) Applicant: GUANGDONG OPPO MOBILE TELECOMMUNICATIONS CORP., LTD., Dongguan (CN)

(72) Inventors: Zhenshan Zhao, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 374 days.

(21) Appl. No.: 17/883,525

(22) Filed: Aug. 8, 2022

(65) Prior Publication Data

US 2022/0386325 A1    Dec. 1, 2022

Related U.S. Application Data

(63) Continuation of application No. PCT/CN2020/091406, filed on May 20, 2020.

(30) Foreign Application Priority Data

Feb. 25, 2020   (WO) ............... PCT/CN2020/076652
Mar. 12, 2020   (WO) ............... PCT/CN2020/079045

(51) Int. Cl.
*H04W 72/02*    (2009.01)
*H04L 5/00*     (2006.01)
*H04W 72/566*   (2023.01)

(52) U.S. Cl.
CPC ......... *H04W 72/569* (2023.01); *H04L 5/0055* (2013.01)

(58) Field of Classification Search
CPC ............................. H04W 72/02; H04L 12/28
(Continued)

(56) References Cited

U.S. PATENT DOCUMENTS

2017/0048846 A1   2/2017 Yang et al.
2019/0149279 A1   5/2019 Lee et al.
(Continued)

FOREIGN PATENT DOCUMENTS

CN    104380627 A   2/2015
CN    107634822 A   1/2018
(Continued)

OTHER PUBLICATIONS

First Office Action issued in corresponding Indian application No. 202227044868, mailed Nov. 16, 2022.
(Continued)

*Primary Examiner* — Dang T Ton
(74) *Attorney, Agent, or Firm* — BAYES PLLC

(57) ABSTRACT

Disclosed are an information sending method and apparatus, an information receiving method and apparatus, and a device and a storage medium, wherein same relate to the field of mobile communications. The information sending method comprises: a terminal device sending a negative acknowledgement (NACK) to a network device on an uplink resource when sidelink data transmitted on a sidelink resource does not need sidelink feedback. The information receiving method comprises: a network device receiving a NACK sent by a terminal device on an uplink resource; and allocating a retransmission resource of sidelink data to the terminal device according to the NACK. By means of the present application, uplink resources can be effectively utilized, and the transmission success rate of sidelink data and the resource utilization rate of the uplink resources can be improved.

15 Claims, 9 Drawing Sheets

(58) Field of Classification Search
USPC .......................................... 370/329, 401, 403
See application file for complete search history.

(56) References Cited

U.S. PATENT DOCUMENTS

| | | | | |
|---|---|---|---|---|
| 2019/0306923 | A1* | 10/2019 | Xiong | .................. H04L 27/261 |
| 2019/0364588 | A1 | 11/2019 | Lu et al. | |
| 2020/0029318 | A1 | 1/2020 | Guo | |
| 2021/0105055 | A1* | 4/2021 | Chae | ..................... H04L 5/0091 |

FOREIGN PATENT DOCUMENTS

| | | | |
|---|---|---|---|
| CN | 109075905 | A | 12/2018 |
| CN | 110169094 | A | 8/2019 |
| CN | 110311768 | A | 10/2019 |
| CN | 110351684 | A | 10/2019 |
| CN | 110495130 | A | 11/2019 |
| CN | 110582067 | A | 12/2019 |
| CN | 110830151 | A | 2/2020 |
| CN | 110830199 | A | 2/2020 |
| CN | 110831158 | A | 2/2020 |
| WO | 2018018620 | A1 | 2/2018 |
| WO | 2018194388 | A1 | 10/2018 |
| WO | 2020030703 | A1 | 2/2020 |

OTHER PUBLICATIONS

Third Office Action issued in corresponding Chinese application No. 202210933135.8, mailed Mar. 2, 2024.
Notice of Allowance issued in corresponding Chinese application No. 202210933135.8, mailed May 8, 2024.
Title: [Running CR] Introduction of 5G V2X with NR Sidelink; Source to WG: LG Electronics Inc. 3GPP TSG-RAN WG2 Meeting #109-e R2-2000235 Online, Feb. 24-Mar. 6, 2020.
International Search Report issued in International Application No. PCT/CN2020/079045, mailed Nov. 26, 2020, 4 pages.
Written Opinion of the International Searching Authority issued in International Application No. PCT/CN2020/079045, mailed Nov. 26, 2020, 9 pages.
"Remaining Issues on NR Sidelink Mode 1 Resource Allocation", R1-2000835, Source: InterDigital Inc., 3GPP TSG RAN WG1 #100 e-Meeting, Feb. 24-Mar. 6, 2020, 2 pages.
"Remaining issues of mode 1 resource allocation for NR-V2X", R1-2000490, Source: OPPO, 3GPP TSG RAN WG1 #100 e-Meeting, Feb. 24-Mar. 6, 2020, 9 pages.
"Resource Allocation Mode 1 for NR SL", R1-2001008, Source: Ericsson, 3GPP TSG-RAN WG1 Meeting #100-e e-Meeting, Feb. 24-Mar. 6, 2020, 8 pages.
International Search Report issued in International Application No. PCT/CN2020/076652, mailed Nov. 26, 2020, 4 pages.
Written Opinion of the International Searching Authority issued in International Application No. PCT/CN2020/076652, mailed Nov. 26, 2020, 11 pages.
International Search Report issued in International Application No. PCT/CN2020/091406, mailed Nov. 17, 2020, 6 pages.
Written Opinion of the International Searching Authority issued in International Application No. PCT/CN2020/091406, mailed Nov. 17, 2020, 12 pages.
"Remaining Aspects of HARQ for NR V2X", R2-2000550, Source: InterDigital Inc., 3GPP RAN WG2 Meeting #109e Feb. 24-Mar. 6, 2020, 2 pages.
"Consideration of BSR in NR V2X", R2-1905681, Source: Spreadtrum Communications, 3GPP TSG-RAN WG2 Meeting #106 Reno, USA, May 13-17, 2019, 2 pages.
"Sidelink Resource Allocation Mechanism for NR V2X", R1-1907271, Source: Qualcomm Incorporated, 3GPP TSG RAN WG1 Meeting #97 Reno, USA, May 13-17, 2019, 16 pages.
"Left issues on MAC for NR-V2X", R2-1913941, Source: OPPO, 3GPP TSG-RAN WG2 Meeting #107bis Chongqing, China, Oct. 14-Oct. 18, 2019, 12 pages.
Second Office Action issued in corresponding Chinese application No. 202210933135.8, mailed Dec. 4, 2023.
First Office Action issued in corresponding Japanese application No. 2022-547318, mailed Feb. 9, 2024.
Notice of Allowance issued in corresponding European application No. 20920839.6, mailed Feb. 14, 2024.
Source: Samsung; Title: On Mode 1 for NR sidelink 3GPP TSG RAN WG1 #100-e R1-2000616 e-Meeting, Feb. 24-Mar. 6, 2020.
Source: vivo; Title: Remaining issues on HARQ support for NR Sidelink 3GPP TSG-RAN WG2 Meeting #109 electronic R2-2000287 E-Meeting, Feb. 24-Mar. 6, 2020.
Source: InterDigital Inc.; Title: Physical Layer Procedures for NR V2X Sidelink 3GPP TSG RAN WG1 Ad-Hoc Meeting 1901 R1-1900794 Taipei, Taiwan, Jan. 21-25, 2019.
Source: Apple; Title: Remaining Details on Mode 1 Resource Allocation 3GPP TSG RAN WG1 #100-e R1-2000851 e-Meeting, Feb. 24-Mar. 6, 2020.
Priority Review issued in corresponding Chinese application No. 202210933135.8, mailed Jul. 21, 2023.
Extended European Search Report issued in corresponding European application No. 20920839.6, mailed Jun. 1, 2023.
First Office Action issued in corresponding Chinese application No. 202210933135.8, mailed Jul. 29, 2023.
Vivo, "HARQ feedback of SL transmission reporting on uplink", R2-2000285, 3GPP Tsg-Ran WG2 Meeting #109-e E-Meeting, 28th Feb - Mar. 6, 2020.
Oppo, "Mode 1 resource allocation for Nr Sl", R1-1912790, 3GPP Tsg Ran WG1 #99 Reno, USA, November 18th 22nd, 2019.
Request for the Submission of an Opinion issued in corresponding Korean Application No. 10-2022-7026778, mailed on Jun. 10, 2025, 10 pages.
Mode-1 resource allocation for NR V2X, Agenda Item: 7.2.4.2.1, Source: ITL, 3GPP TSG RAN WG1 #100-e, R1-2000699, e-Meeting, Feb. 24-Mar. 6, 2020, 10 pagees.

* cited by examiner

INFORMATION SENDING METHOD AND APPARATUS, INFORMATION RECEIVING METHOD AND APPARATUS, AND DEVICE AND STORAGE MEDIUM

CROSS-REFERENCE TO RELATED APPLICATIONS

This application is a continuation of International Application No. PCT/CN2020/091406, filed on May 20, 2020, which claims the benefit of priority to International Application No. PCT/CN2020/076652 filed on Feb. 25, 2020 and entitled "INFORMATION SENDING METHOD, INFORMATION RECEIVING METHOD, APPARATUS, DEVICE AND STORAGE MEDIUM", and International Application No. PCT/CN2020/079045 filed on Mar. 12, 2020 and entitled "INFORMATION SENDING METHOD, INFORMATION RECEIVING METHOD, APPARATUS, DEVICE AND STORAGE MEDIUM", the contents of which are incorporated herein by reference in their entireties.

TECHNICAL FIELD

The present application relates to the field of mobile communication, in particular, to a method for sending information, a method for receiving information, an apparatus, a device and a storage medium.

BACKGROUND

In order to realize the direct communication between terminal devices in the Vehicle to everything (V2X) system, SideLink (SL) transmission mode is introduced.

In one transmission mode of SL, the network device allocates a sidelink resource to terminal device A, and terminal device A uses the sidelink resource to send sidelink data 1 to terminal device B. If terminal device B fails to correctly receive sidelink data 1, terminal device B sends a negative acknowledgment (NACK) to terminal device A. Terminal device A forwards NACK to the network device, and the network device allocates a retransmission resource to terminal device A.

Since terminal device A decides which sidelink data to transmit on the sidelink resource by itself, when terminal device A transmits sidelink data 2 on the sidelink resource and sidelink data 2 does not need a sidelink feedback, the uplink resource will be wasted.

SUMMARY

The embodiments of the present application provide a method for sending information, an apparatus for receiving information, a device and a storage medium, which can effectively utilize the allocated uplink resource when the terminal device transmits sidelink data that does not need sidelink feedback. The technical solutions are as follows.

According to an aspect of the present application, there is provided a method for sending information, applied to a terminal device, the method including:
  in a case that sidelink data transmitted on a sidelink resource does not need a sidelink feedback, sending an NACK to a network device on an uplink resource.

According to an aspect of the present application, there is provided a method for receiving information for a network device, the method including:
  receiving an NACK sent by a terminal device on an uplink resource, where the NACK is sent by the terminal device in a case that sidelink data transmitted on the sidelink resource does not need a sidelink feedback; and
  allocating a retransmission resource of the sidelink data to the terminal device according to the NACK.

According to an aspect of the present application, there is provided a method for sending information, applied to a terminal device, the method including:
  receiving first configuration information from a network device, where the first configuration information is used for allocating a sidelink resource and an uplink resource for the terminal device, and the sidelink resource is used for sending sidelink data of the terminal device;
  acquiring second configuration information, where the second configuration information is used for configuring a corresponding relationship, and the corresponding relationship includes: a relationship between a first parameter of the sidelink data and the maximum number of times of transmission; and
  sending an acknowledgement response (ACK) or NACK to the network device on the uplink resource according to the first parameter of the sidelink data and the corresponding relationship.

According to an aspect of the present application, there is provided a method for receiving information, applied to a network device, the method including:
  sending first configuration information to a terminal device, where the first configuration information is used for allocating a sidelink resource and an uplink resource for the terminal device, and the sidelink resource is used for sending sidelink data of the terminal device;
  sending second configuration information to the terminal device, where the second configuration information is used for configuring a corresponding relationship, and the corresponding relationship includes: a relationship between a first parameter of the sidelink data and the maximum number of times of transmission; and
  receiving an ACK or NACK sent by the terminal device on the uplink resource, where the ACK or NACK is sent by the terminal device according to the first parameter of the sidelink data and the corresponding relationship.

According to an aspect of the present application, there is provided a method for sending information, applied to a terminal device, the method including:
  receiving first configuration information from a network device, where the first configuration information is used for allocating a sidelink resource and an uplink resource for the terminal device, and the sidelink resource is used for sending sidelink data of the terminal device;
  acquiring third configuration information and determining that there is no sidelink feedback resource according to the third configuration information; and
  sending an ACK to the network device on the uplink resource.

According to an aspect of the present application, there is provided a method for receiving information, applied to a network device, the method including:
  sending first configuration information to a terminal device, where the first configuration information is used for allocating a sidelink resource and an uplink resource for the terminal device, and the sidelink resource is used for sending sidelink data of the terminal device; and receiving an acknowledgment (ACK) sent by the terminal device on the uplink resource, where the acknowledgment (ACK) is sent by the terminal device when determining that there is no sidelink feedback resource according to the third configuration information.

According to an aspect of the present application, there is provided an apparatus for sending information, the apparatus including:

a sending module, configured to, in a case that sidelink data transmitted on a sidelink resource does not need a sidelink feedback, send an NACK to a network device on the uplink resource.

According to an aspect of the present application, there is provided an information receiving apparatus, the apparatus including:

a receiving module, configured to receive a negative acknowledgment (NACK) sent by a terminal device on an uplink resource, where the NACK is sent by the terminal device in a case that sidelink data transmitted on a sidelink resource does not need a sidelink feedback;

an allocation module, configured to allocate a retransmission resource of the sidelink data to the terminal device according to the NACK.

According to an aspect of the present application, there is provided an apparatus for sending information, the apparatus including:

a receiving module, configured to receive first configuration information from a network device, where the first configuration information is used for allocating a sidelink resource and an uplink resource for the apparatus, and the sidelink resource is used for sending sidelink data of the apparatus;

the receiving module is further configured to receive second configuration information from the network device, where the second configuration information is used for configuring a corresponding relationship, and the corresponding relationship includes: a relationship between a first parameter of the sidelink data and the maximum number of times of transmission;

a sending module configured to send an ACK or NACK to the network device on the uplink resource according to the first parameter of the sidelink data and the corresponding relationship.

According to an aspect of the present application, there is provided an apparatus for receiving information, the apparatus including:

a sending module, configured to send first configuration information to a terminal device, where the first configuration information is used for allocating a sidelink resource and an uplink resource for the terminal device, and the sidelink resource is used for sending sidelink data of the terminal device;

the sending module is further configured to send second configuration information to the terminal device, where the second configuration information is used for configuring a corresponding relationship, and the corresponding relationship includes: a relationship between a first parameter of the sidelink data and the maximum number of times of transmission;

a receiving module, configured to receive an ACK or NACK sent by the terminal device on the uplink resource, where the ACK or NACK is sent by the terminal device according to the first parameter of the sidelink data and the corresponding relationship.

According to an aspect of the present application, there is provided an apparatus for sending information, the apparatus including:

a receiving module, configured to receive first configuration information from a network device, where the first configuration information is used for allocating a sidelink resource and an uplink resource for the terminal device, and the sidelink resource is used for sending sidelink data of the terminal device;

an acquisition module, configured to acquire third configuration information and determine that there is no sidelink feedback source according to the third configuration information; and a sending module, configured to send an ACK to the network device on the uplink resource.

According to an aspect of the present application, there is provided an apparatus for receiving information, the apparatus including:

a sending module, configured to send first configuration information to a terminal device, where the first configuration information is used for allocating a sidelink resource and an uplink resource for the terminal device, and the sidelink resource is used for sending sidelink data of the terminal device; and a receiving module, configured to receive an acknowledgment (ACK) sent by the terminal device on the uplink resource, where the acknowledgment (ACK) is sent by the terminal device when determining that there is no sidelink feedback resource according to the third configuration information.

According to an aspect of the present application, there is provided a terminal device, including:

a processor;

a transceiver connected to the processor; and a memory for storing executable instructions of the processor;

where the processor is configured to load and execute the executable instructions to implement the method for sending information described in the above aspects.

According to an aspect of the present application, there is provided a network device, including:

a processor;

a transceiver connected to the processor; and a memory for storing executable instructions of the processor;

where the processor is configured to load and execute the executable instructions to implement the method for receiving information described in the above aspects.

According to an aspect of the present application, there is provided a computer-readable storage medium in which executable instructions are stored, and the executable instructions are loaded and executed by a processor to implement the method for sending information described in the above aspects.

According to an aspect of the present application, there is provided a computer-readable storage medium in which executable instructions are stored, and the executable instructions are loaded and executed by a processor to implement the method for receiving information described in the above aspects.

The technical solutions provided by the embodiments of the present application include at least the following beneficial effects.

When the sidelink data transmitted on the sidelink resource through the terminal device does not need sidelink feedback, the NACK is sent to the network device on the uplink resource, and the NACK is used to trigger the network device to allocate the retransmission resource of the sidelink data to the terminal device. Therefore, in the case that the sidelink data does not need sidelink feedback, the present application can also effectively use the uplink resource, so that the network device can allocate the retransmission resource of the sidelink data to the terminal device according to the NACK, and the transmission success rate of the sidelink data and the resource utilization rate of the uplink resource are improved.

DETAILED DESCRIPTION

In order to make the objectives, technical solutions and advantages of the present application more clear, the embodiments of the present application will be further described in detail below with reference to the accompanying drawings.

First, the terms involved in the embodiments of the present application are briefly introduced:

Vehicle to everything (V2X): It is the key technology of the future intelligent transportation system, and it mainly studies the vehicle data transmission scheme based on the 3GPP communication protocol. V2X communication includes Vehicle to Vehicle (V2V) communication, Vehicle to Infrastructure (V2I) communication, and Vehicle to People (V2P) communication. V2X applications can improve driving safety, reduce congestion and vehicle energy consumption, improve traffic efficiency, etc.

Figure 1:
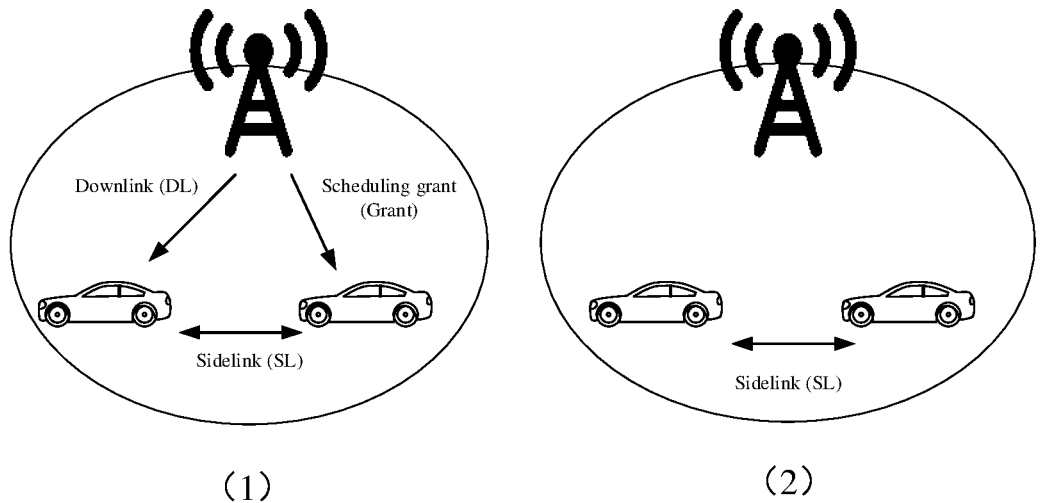
FIG. 1 is a schematic diagram of a transmission mode of the sidelink provided by an exemplary embodiment of the present application.

SideLink (SL) transmission: It is a communication method from a terminal device to a terminal device, which has relatively high spectral efficiency and relatively low transmission delay. Two transmission modes of the sidelink are defined in 3GPP: Mode A and Mode B. As shown in (1) in FIG. 1, in mode A, the transmission resource of the terminal device is allocated by the network device (such as the base station) through the downlink (DL), and the terminal device sends data on the sidelink according to the resource allocated by the base station. The network device may allocate the resource for single transmission (dynamic allocation) to terminal device, and may also allocate the resource for semi-static transmission to terminal device. As shown in (2) in FIG. 1, in mode B, the terminal device selects one sidelink resource from a resource pool for data transmission. Specifically, the terminal device may select the sidelink resource from the resource pool by means of listening, or select the sidelink resource from the resource pool by means of random selection.

Figure 2:
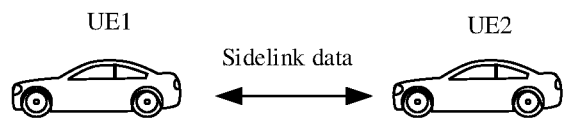
FIG. 2 is a schematic diagram of unicast transmission in vehicle to everything communication provided by an exemplary embodiment of the present application.
Figure 3:
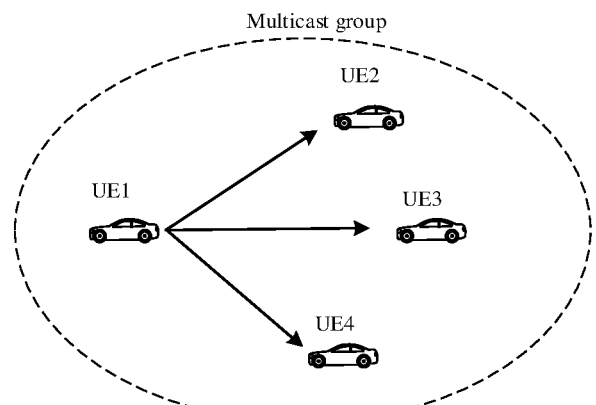
FIG. 3 is a schematic diagram of multicast transmission in vehicle to everything communication provided by an exemplary embodiment of the present application.
Figure 4:
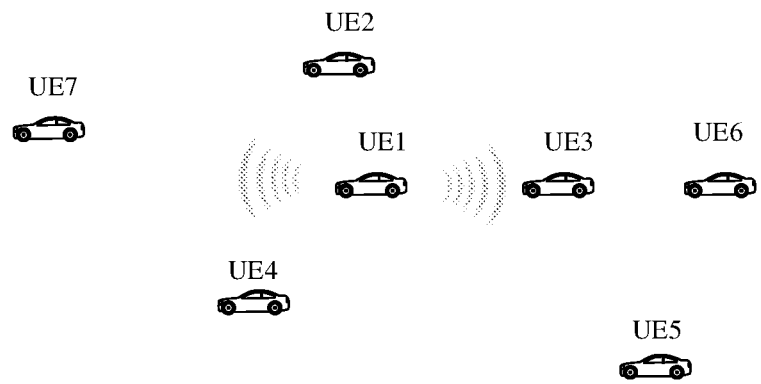
FIG. 4 is a schematic diagram of broadcast transmission in vehicle to everything communication provided by an exemplary embodiment of the present application.

In LTE-V2X, broadcast transmission is supported, and in NR-V2X, unicast and multicast transmissions are introduced. For unicast transmission, there is only one terminal at the receiving end. As shown in FIG. 2, unicast transmission is performed between user equipment (User Equipment, UE1) and UE2. For multicast transmission, the receiving end is all UEs in one multicast group, or all terminals within a certain transmission distance. As shown in FIG. 3, UE1, UE2, UE3 and UE4 form one multicast group, where UE1 sends data, and other UEs in the group are terminals of receiving end. For broadcast transmission mode, the receiving end is any terminal. As shown in FIG. 4, UE1 is the terminal of sending end, and other UEs around it are terminals of receiving end.

Sidelink Configured Grant (CG)

In New Radio (NR)-V2X, information sending manners of mode 1 and mode 2 are supported. In mode 2, the terminal autonomously selects the sidelink resource in the resource pool for sidelink transmission, that is, mode B shown in FIG. 1. In mode 1, the network allocates the sidelink resource to the terminal device, that is, mode A shown in FIG. 1. Specifically, the network device may allocate the sidelink resource to the terminal device in a Dynamic Scheduling manner; or the network device may allocate sidelink configured grant (SL CG) sidelink resource to the terminal device. For the information sending manner of CG, there are mainly two configured grant manners: type-1 configured grant (the first type of configured grant) and type-2 configured grant (the second type of configured grant).

The first type of configured grant: the network device configures the sidelink resource for the terminal device through Radio Resource Control (RRC) signaling. The RRC signaling configuration includes a time domain resource, a frequency domain resource, and a Demodulation Reference Signal (DMRS), a Modulation and Coding Scheme (MCS) and other sidelink resources and transmission parameters. After the UE receives the higher layer parameter, it may immediately use the configured transmission parameter to perform sidelink transmission on the configured time-frequency resource.

The second type of configured grant: it adopts a two-step resource configuration method, that is, the method of RRC+ Downlink Control Information (DCI); first, the RRC signaling configures the sidelink resource and transmission parameter including the cycle of time-frequency resource, the number of Hybrid Automatic Repeat reQuest (HARQ) processes, etc., then the DCI activates the transmission of the second type of configured grant, and configures other sidelink resources and transmission parameters including a time-domain resource, a frequency-domain resource, MCS, etc. When the UE receives the RRC signaling, it cannot immediately use the resource and parameter configured by the higher layer parameter for sidelink transmission. Instead, the UE can only perform sidelink transmission after receiving the corresponding DCI activation and configuring other resources and transmission parameters. In addition, the network device may deactivate the configuration transmission through DCI, and after the terminal device receives the deactivated DCI, it can no longer use the sidelink resource for sidelink transmission.

If the network device allocates the sidelink resource of the second type of configured grant to the terminal device, when the terminal device has sidelink data to transmit, it may directly use the sidelink resource for transmission without sending a Scheduling Request (SR)/Buffer Status Report (BSR) to the network device to request the sidelink resource, thereby reducing latency.

Sidelink Feedback Channel (Physical Sidelink Feedback Channel, PSFCH):

In NR-V2X, in order to improve reliability, a sidelink feedback channel is introduced. For example, for unicast transmission, the sending end terminal sends sidelink data (including PSCCH and PSSCH) to the receiving end terminal, the receiving end terminal sends HARQ feedback information to the sending end terminal, and the sending end terminal determines whether it is necessary to retransmit according to the feedback information of the receiving end terminal. The HARQ feedback information is carried in the sidelink feedback channel, for example, the HARQ feedback information includes an acknowledgement (ACK) or a negative acknowledgement (NACK).

Figure 5:
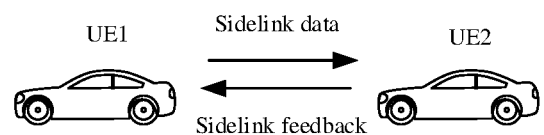
FIG. 5 is a schematic diagram of a sidelink feedback mechanism in vehicle to everything communication provided by an exemplary embodiment of the present application.

The sidelink feedback may be activated or deactivated through pre-configuration information or network device configuration information. If the sidelink feedback is activated, the receiving end terminal receives the sidelink data sent by the sending end terminal, and feeds back the HARQ ACK or HARQ ACK to the sending end according to the detection result. The sending end terminal decides to send retransmission data or new data according to the feedback information of the receiving end, as shown in FIG. 5. If the sidelink feedback is deactivated, the receiving end terminal does not need to send feedback information, and the sending end terminal usually adopts blind retransmission to send data. For example, the sending end terminal repeatedly sends K times for each sidelink data, where K is an integer greater than or equal to 1, instead of deciding whether to send retransmission data according to the feedback information of the receiving end terminal.

In mode 1, the network device allocates the sidelink resource to the terminal device. If the sending end terminal uses the resource to transmit sidelink data that supports sidelink feedback, the receiving end sends sidelink feedback information to the sending end, the sending end reports the sidelink feedback information to the network device, and the network device decides whether to allocate the retransmission resource according to the sidelink feedback information reported by the sending end.

Specifically, the network device may allocate a PUCCH resource to the terminal device, and the PUCCH sidelink resource is used for the sending end terminal to report the sidelink feedback information to the network device.

Figure 6:
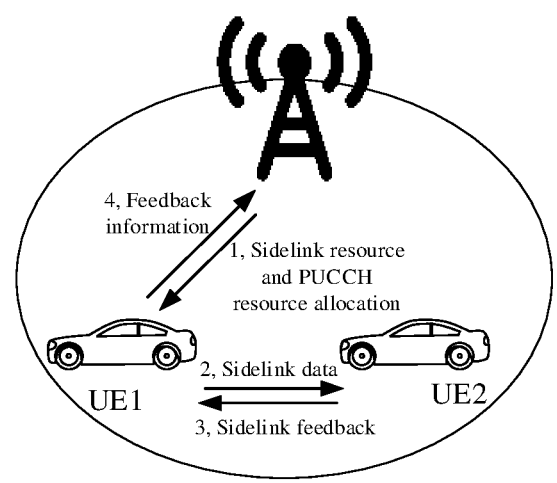
FIG. 6 is a schematic diagram of a terminal device sending sidelink feedback information to a network device provided by an exemplary embodiment of the present application.

As shown in FIG. 6, UE1 is the sending end UE, UE2 is the receiving end UE, gNB allocates the sidelink resource for UE1, and allocates the sidelink resource of PUCCH, UE1 sends the sidelink data PSCCH/PSSCH to UE2 on the sidelink resource allocated by the network device, UE2 sends sidelink feedback information (such as sending HARQ-ACK on PSFCH) to UE1 according to the detection result of the sidelink data, to indicate whether the sidelink data is received correctly, and UE1 reports the sidelink feedback information to the network device through PUCCH, and the network device decides whether to allocate the retransmission resource for UE1 according to the sidelink feedback information reported by UE1.

However, after the network device allocates the sidelink resource to the terminal device, the terminal device decides which sidelink data to transmit using the sidelink resource. For example, the first type of sidelink data may be transmitted. The first type of sidelink data needs the receiving end terminal to send sidelink feedback. For example, the SCI sent by the terminal device carries indication information, which is used to instruct the receiving end terminal to send the sidelink feedback. The terminal device may also transmit the second type of sidelink data. The second type of sidelink data does not require the receiving end terminal to send sidelink feedback, but since the network device allocates the uplink resource to the terminal device for sending the sidelink feedback to the network device by the terminal device, how the terminal device reports the sidelink feedback on the uplink resource is a problem that needs to be solved.

Figure 7:
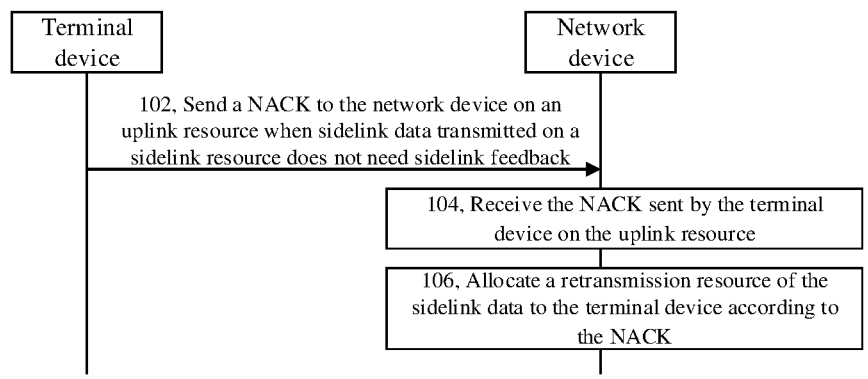
FIG. 7 is a flowchart of a method for sending information provided by an exemplary embodiment of the present application.

FIG. 7 shows a flowchart of a method for sending information provided by an exemplary embodiment of the present application. The present embodiment is illustrated by taking the method applied to the communication system shown in FIG. 1 as an example. The method includes the following steps.

In step 102, in a case that the sidelink data transmitted on the sidelink resource does not require sidelink feedback, the terminal device sends an NACK to the network device on the uplink resource.

The transmission resource is a resource allocated by the network device to the terminal device, that is, the terminal device works in mode 1, and the sidelink resources are all allocated by the network device. The transmission resource includes at least one of the sidelink resource and the uplink resource. The sidelink resource is used for sending the initial transmission and/or retransmission of the sidelink data, and the uplink resource is used for sending the feedback (ACK or NACK) of the sidelink data. The sidelink data is the data decided to be transmitted on the sidelink resource by the terminal device at its own discretion. In this embodiment, the transmission resource including the sidelink resource and the uplink resource is taken as an example for description.

Since the terminal device decides which kind of sidelink data to transmit on the sidelink transmission resource, in a possible case, the sidelink data is the first type of sidelink data, and the first type of sidelink data is the data that requires the receiving end terminal to perform sidelink feedback; in another possible case, the sidelink data is the second type of sidelink data, and the second type of sidelink data is data that does not require sidelink feedback from the receiving end terminal.

If the network device allocates the sidelink transmission resource to the terminal device and allocates the uplink resource, and the terminal device sends the second type of sidelink data on the sidelink resource, the terminal device may perform multiple repeated transmissions to improve the reliability of data transmission. However, when the network terminal allocates the sidelink resource to the terminal device, all the sidelink resources are allocated by the network device, so the terminal device sends an NACK to the network device on the uplink resource.

In step 104, the network device receives the NACK sent by the terminal device on the uplink resource, and the NACK is sent under the condition that the sidelink data transmitted by the terminal device on the sidelink resource does not require sidelink feedback.

The uplink resource may be a resource on a Physical Uplink Control Channel (PUCCH). The uplink resource is a resource corresponding to the sidelink resource, for example, a time interval between the PUCCH transmission resource and the sidelink transmission resource is determined according to the network configuration information.

In step 106, the network device allocates a retransmission resource of the sidelink data to the terminal device according to the NACK.

The network device receives the NACK. This information indicates that the sidelink data is not correctly received, or that the terminal device needs to retransmit the sidelink data, or that the terminal device needs to be allocated the sidelink resource.

In the case of receiving the NACK, the network device continues to allocate the sidelink resource to the terminal device; optionally, the sidelink resource is used to retransmit the sidelink data.

It should be noted that, steps 102 to 106 may be performed multiple times.

Figure 8:
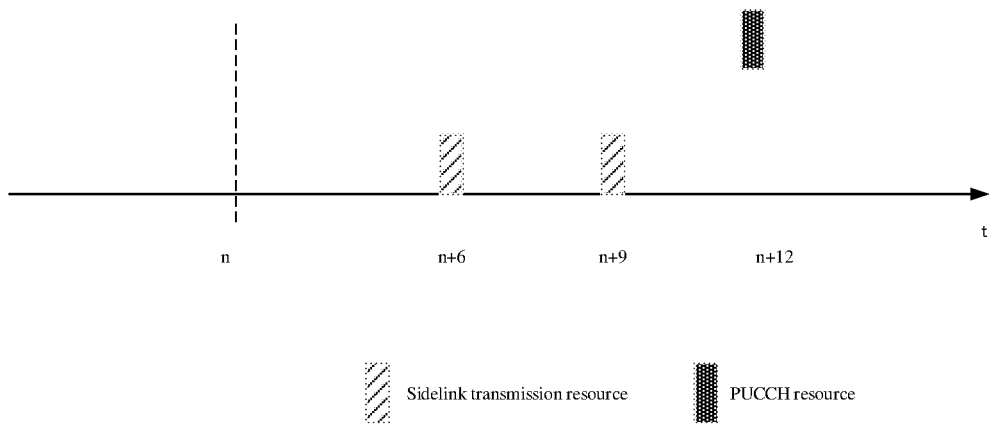
FIG. 8 is a schematic diagram of a method for sending information provided by an exemplary embodiment of the present application.

Exemplarily, with reference to FIG. 8, at time n, terminal device A has sidelink data arriving, and needs to transmit the sidelink data. Assuming that the sidelink data is data that does not require sidelink feedback, terminal device A sends an SR/BSR to the network device to request for the sidelink resource, and the network device allocates 2 sidelink resources and 1 PUCCH resource to terminal device A. The time domain positions of the 2 sidelink resources correspond to (n+6) ms and (n+9) ms respectively, the time domain position of the PUCCH resource is (n+12) ms, and terminal device A uses the first sidelink resource (n+6) ms to send the initial transmission of the sidelink data, and uses the second sidelink resource (n+9) ms to send the retransmission of the sidelink data. In addition, terminal device A reports NACK to the network device on the PUCCH resource, so as to trigger the network device to continue to schedule the retransmission resource of the sidelink resource for terminal device A.

To sum up, the method provided by the present embodiment sends NACK to the network device on the uplink resource when the sidelink data transmitted by the terminal device on the sidelink resource does not require sidelink feedback, and the NACK is used to trigger the network device to allocate the retransmission resource for the sidelink data to the terminal device. Therefore, in the case that the sidelink data does not require sidelink feedback, the present application can also effectively utilize the uplink resource, so that the network device can allocate the retransmission resource of the sidelink data to the terminal device according to the NACK, which improves the transmission success rate of the sidelink data and resource utilization of the uplink resource.

Figure 9:
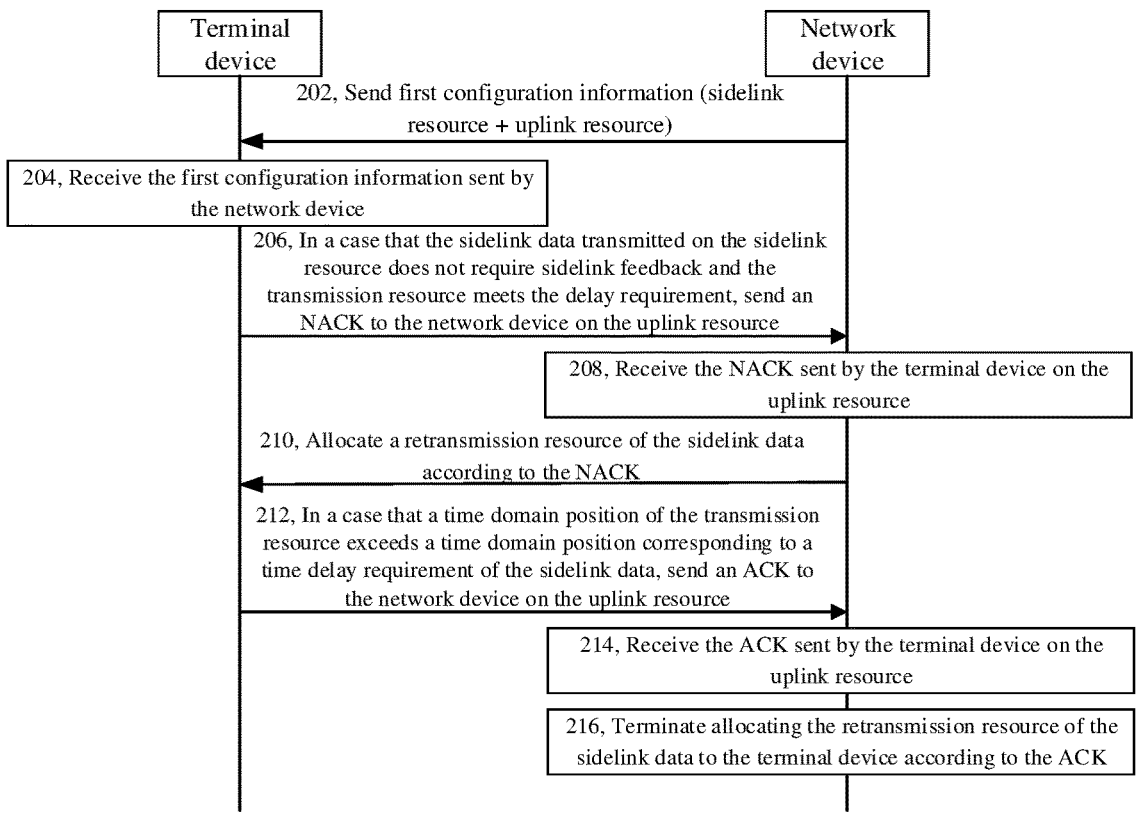
FIG. 9 is a flowchart of a method for sending information provided by an exemplary embodiment of the present application.

FIG. 9 shows a flowchart of a method for sending information provided by another exemplary embodiment of the present application. The present embodiment is illustrated by taking the method applied to the communication system shown in FIG. 1 as an example. The method includes the following steps.

In step 202, the network device sends first configuration information to the terminal device, where the first configuration information is used to allocate a sidelink resource and an uplink resource.

In an example, when there is sidelink data that needs to be sent in the terminal device, the terminal device sends SR or BSR to the network device. The network device receives the SR or BSR sent by the terminal device, and allocates a transmission resource to the terminal device according to the SR or BSR.

Exemplarily, the transmission resource includes at least one of a sidelink resource and an uplink resource. In this embodiment, the transmission resource including the sidelink resource and the uplink resource is taken as an example for illustration. The sidelink resource is used for sending the initial transmission and/or retransmission of the sidelink data, and the uplink resource is used for sending a feedback (ACK or NACK) of the sidelink data. The sidelink data is data that the terminal device decides to transmit on the sidelink resource, such as sidelink data that does not require sidelink feedback.

In an example, the first configuration information is Downlink Control Information (DCI), and the network device sends the DCI to the terminal device, where the DCI is used for allocating the sidelink resource and the uplink resource.

In an example, the first configuration information is a sidelink configured grant, and the network device sends the sidelink configured grant to the terminal device, where the sidelink configured grant is used for allocating the sidelink resource and the uplink resource.

Optionally, the uplink resource refers to a PUCCH resource.

In step 204, the terminal device receives first configuration information sent by the network device, where the first configuration information is used to allocate the sidelink resource and the uplink resource.

In an example, the terminal device receives the DCI sent by the network device, where the DCI is used to allocate the sidelink resource and the uplink resource.

In an example, the terminal device receives a sidelink configured grant sent by the network device, where the sidelink configured grant is used to allocate the sidelink resource and the uplink resource.

In step 206, when the sidelink data transmitted by the terminal device on the sidelink resource does not require sidelink feedback and the transmission resource meets the delay requirement, the terminal device sends an NACK to the network device on the uplink resource.

The fact that the transmission resource meets the delay requirement means that the time domain positions of the sidelink resource and the uplink resource do not exceed the time domain position corresponding to the delay requirement of the sidelink data. The time domain position corresponding to the time delay requirement refers to the time indicated by "the service arrival time of the sidelink data+the time delay requirement".

The NACK is used to trigger the network device to allocate a retransmission resource of the sidelink data to the terminal device.

In step 208, the network device receives the NACK sent by the terminal device on the uplink resource, and the NACK is sent when the sidelink data transmitted by the terminal device on the sidelink resource does not require sidelink feedback and the transmission resource meets the time delay requirement.

In step 210, the network device allocates the retransmission resource of the sidelink data to the terminal device according to the NACK.

In an example, in the case of receiving the NACK, the network device allocates the sidelink resource to the terminal device; optionally, the sidelink resource is used to retransmit the sidelink data.

In an example, the network device allocates the retransmission resource of the sidelink data to the terminal device when receiving the NACK and the number of transmissions of the sidelink data does not reach the maximum number of transmissions; when the number of transmissions reaches the maximum number of transmissions, no retransmission resource of the sidelink data is allocated to the terminal device. That is, the network device makes a comprehensive decision whether to continue allocating the retransmission resource in combination with the maximum number of transmissions of the sidelink data.

It should be noted that steps 206 to 210 may be performed multiple times.

In step 212, when the time domain position of the transmission resource exceeds the time domain position corresponding to the time delay requirement of the sidelink data, the terminal device sends an ACK to the network device on the uplink resource.

In the case that the time domain position of the sidelink resource exceeds the time domain position corresponding to the time delay requirement of the sidelink data, the terminal device sends an ACK to the network device on the uplink resource; and/or, in the case that the time domain position of the uplink resource exceeds the time domain position corresponding to the time delay requirement of the sidelink data, the terminal device sends an ACK to the network device on the uplink resource.

In step 214, the network device receives the ACK sent by the terminal device on the uplink resource.

In step 216, the network device terminates allocating the retransmission resource of the sidelink data to the terminal device according to the ACK.

To sum up, the method provided by the present embodiment sends NACK to the network device on the uplink resource when the sidelink data transmitted by the terminal device on the sidelink resource does not require sidelink feedback, and the NACK is used to trigger the network device to allocate the retransmission resource of the sidelink data to the terminal device. Therefore, in the case that the sidelink data does not require sidelink feedback, the present application can also effectively utilize the uplink resource, so that the network device can allocate the retransmission resource of the sidelink data to the terminal device according to the NACK, which improves the transmission success rate of the sidelink data and the resource utilization of the uplink resource.

In the method provided in this embodiment, when the time domain position of the transmission resource exceeds the time domain position corresponding to the time delay requirement of the sidelink data, the terminal device sends uplink information to the network device, and the uplink information is used to terminate the network device to allocate the retransmission resource of the sidelink data to the terminal device, so that when the sidelink resource allocated by the network device does not meet the delay requirement of service, there is no need to continue allocating the retransmission resource to the terminal device, and the allocation of invalid retransmission resource is avoided, thereby reducing the waste of the communication resource.

Taking the sidelink data being sidelink data that does not require sidelink feedback as an example, the following embodiments are provided.

Figure 10:
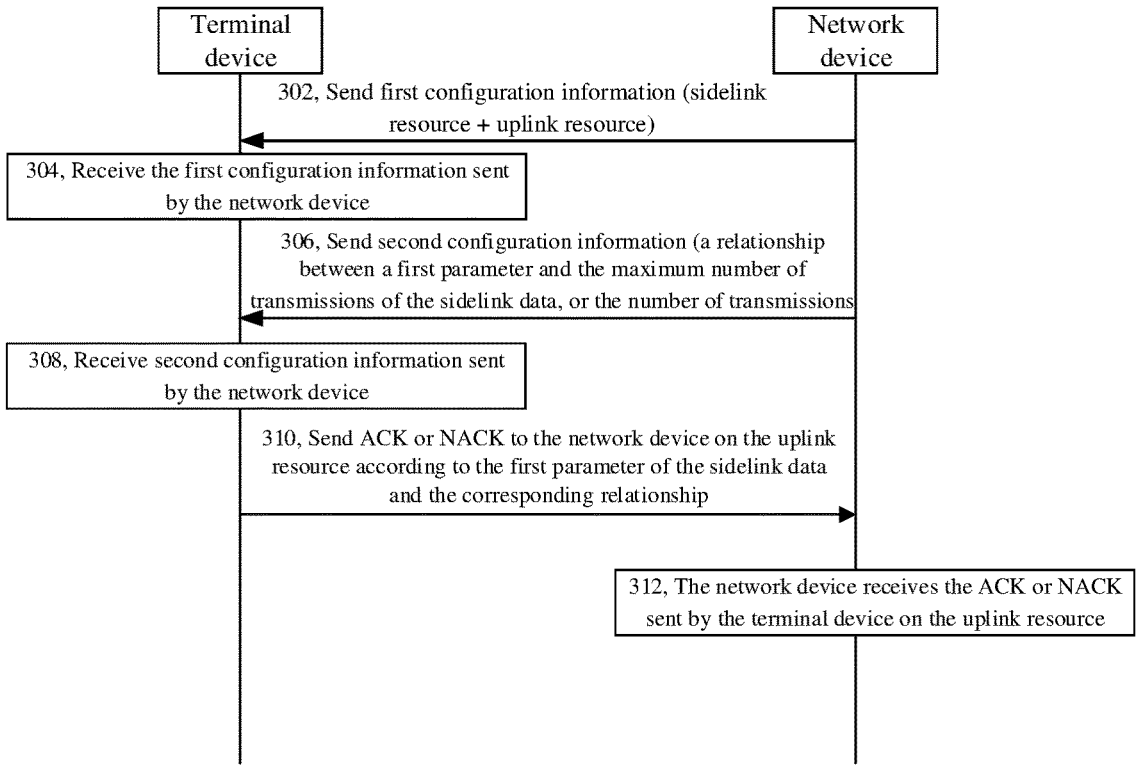
FIG. 10 is a flowchart of a method for sending information provided by an exemplary embodiment of the present application.

FIG. 10 shows a flowchart of a method for sending information provided by an exemplary embodiment of the present application. This embodiment is illustrated by taking the method applied to the communication system shown in FIG. 7 as an example. The method includes the following steps.

In step 302, the network device sends first configuration information to the terminal device, where the first configuration information is used to allocate a sidelink resource and an uplink resource for the terminal device, and the sidelink resource is used to send sidelink data of the terminal device.

In an example, when there is sidelink data that needs to be sent in the terminal device, the terminal device sends SR or BSR to the network device. The network device receives the SR or BSR sent by the terminal device, and allocates the transmission resource to the terminal device according to the SR or BSR.

Exemplarily, the transmission resource includes at least one of sidelink resource and uplink resource. In this embodiment, the transmission resource including the sidelink resource and the uplink resource is taken as an example for illustration. The sidelink resource is used for sending the initial transmission and/or retransmission of the sidelink data, and the uplink resource is used for sending the feedback (ACK or NACK) of the sidelink data. The sidelink data is the data that the terminal device decides to transmit on the sidelink resource, such as sidelink data that does not require sidelink feedback.

In an example, the first configuration information is DCI, and the network device sends the DCI to the terminal device, where the DCI is used for allocating the sidelink resource and the uplink resource.

In an example, the first configuration information is a sidelink configured grant, and the network device sends the sidelink configured grant to the terminal device, where the sidelink configured grant is used for allocating the sidelink resource and the uplink resource.

Optionally, the uplink resource refers to a PUCCH resource.

In step 304, the terminal device receives first configuration information from the network device, where the first configuration information is used to allocate the sidelink resource and the uplink resource for the terminal device, and the sidelink resource is used to send the sidelink data of the terminal device.

In an example, the terminal device receives the DCI sent by the network device, where the DCI is used to allocate the sidelink resource and the uplink resource.

In one example, the terminal device receives a sidelink configured grant sent by the network device, where the sidelink configured grant is used to allocate the sidelink resource and the uplink resource.

In step 306, the network device sends second configuration information to the terminal device, where the second configuration information is used to configure a corresponding relationship, and the corresponding relationship includes: a relationship between a first parameter of the sidelink data and the maximum number of transmissions.

In an example, the second configuration information is Radio Resource Control (RRC) signaling or a System Information Block (SIB), and the network device sends the RRC or SIB to the terminal device to configure the corresponding relationship. The corresponding relationship includes: the relationship between the first parameter of the sidelink data and the maximum number of transmissions. The maximum number of transmissions may be directly represented by numbers, or it may be represented by the maximum number of retransmissions. Among them, the maximum number of transmissions=1 initial transmission+the maximum number of retransmissions.

Optionally, the corresponding relationship includes a relationship between the first parameter of the sidelink data and the maximum number of retransmissions.

Optionally, the first parameter of the sidelink data is a parameter related to a Quality of Service (QoS) attribute. The first parameter includes, but is not limited to, at least one of delay, reliability, and priority. Taking the priority being the first parameter as an example, the corresponding relationship between the priority and the maximum number of transmissions is shown in Table 1 below:

TABLE 1

| Priority | 0 | 1 | 2 | 3 | 4 | 5 | 6 | 7 |
|---|---|---|---|---|---|---|---|---|
| Number of transmissions | 32 | 24 | 20 | 16 | 8 | 4 | 2 | 1 |

Optionally, the first parameter of the sidelink data is a logical channel of the sidelink data. The corresponding relationship between the logical channel of the sidelink data and the maximum number of retransmissions is shown in Table 2 below:

TABLE 2

| Logical Channel | Logical Channel 1 | Logical Channel 2 | Logical Channel 3 |
|---|---|---|---|
| Number of transmissions | 32 | 24 | 16 |

Optionally, the first parameter of the sidelink data includes: a parameter related to a quality of service attribute; and/or, a logical channel of the sidelink data.

Optionally, the above-mentioned corresponding relationship may also be pre-configured, that is, the corresponding relationship is pre-configured in the terminal device.

Optionally, in another possible implementation manner, the network device sends second configuration information to the terminal device, where the second configuration information is used to determine the number of transmissions of the sidelink data (including the maximum number of transmissions or the remaining number of transmissions). The terminal device may determine the remaining number of transmissions of the sidelink data according to the second configuration information. Further, the terminal device may determine the remaining number of transmissions of the sidelink data according to a difference between the maximum number of transmissions of the sidelink data and the number of times that have been transmitted; or, the terminal device directly determines the remaining number of transmissions of the sidelink data from the second configuration information. Optionally, the second configuration information is carried in DCI or RRC signaling. Optionally, the first configuration information and the second configuration information are carried in the same configuration signaling.

For example, the network device sends RRC signaling to the terminal to configure the sidelink resource and the uplink resource, and the RRC signaling includes first indication information, where the indication information is used to indicate the maximum number of transmissions (or maximum number of retransmissions) of the sidelink data. The terminal receives the RRC signaling, transmits the sidelink data on the sidelink resource allocated by the RRC signaling, and may determine the maximum number of transmissions of the sidelink data according to the first indication information.

For another example, the network sends DCI signaling to the terminal, where the DCI signaling is used to configure the sidelink resource and the uplink resource, and the DCI signaling includes second indication information, where the second indication information is used to indicate the maximum number of transmissions, or the maximum number of retransmissions, or the number of remaining transmissions of the sidelink data. The terminal receives the DCI signaling, transmits the sidelink data on the sidelink resource allocated by the DCI signaling, and may determine the maximum number of transmissions or the remaining number of transmissions of the sidelink data according to the second indication information.

It should be noted that this embodiment does not limit the order of execution of the first configuration information and the second configuration information, step 304 may be executed before step 306, step 306 may be executed before step 304, or both are executed simultaneously.

In step 308, the terminal device receives the second configuration information from the network device, the second configuration information is used to configure a corresponding relationship or to determine the number of times of transmission of the sidelink data, and the corresponding relationship includes: a relationship between the first parameter of the sidelink data and the maximum number of transmissions.

Optionally, the first parameter of the sidelink data includes: a parameter related to a quality of service attribute; and/or, a logical channel of the sidelink data.

In step 310, the terminal device sends ACK or NACK to the network device on the uplink resource according to the first parameter of the sidelink data and the corresponding relationship.

The terminal device transmits the first sidelink data on the sidelink resource allocated by the network, and the terminal device determines the maximum number of transmissions of the first sidelink data according to the first parameter of the first sidelink data and the corresponding relationship shown in Table 1 (or Table 2). For example, the priority of the first sidelink data is 3, and according to Table 1, it may be determined that the corresponding maximum number of transmissions is 16. Therefore, before reaching the maximum number of transmissions 16, the terminal device sends an NACK to the network device; and when reaching the maximum number of transmissions 16, the terminal device sends an ACK to the network device.

In another possible implementation manner, the terminal device determines the maximum number of transmissions (or the maximum number of retransmissions) of the sidelink data according to the second configuration information.

In the case that the number of transmissions of the sidelink data does not reach the maximum number of transmissions, the terminal device sends an NACK to the network device on the uplink resource.

When the number of transmissions of the sidelink data reaches the maximum number of transmissions, the terminal device sends an ACK to the network device on the uplink resource.

In step 312, the network device receives the ACK or NACK sent by the terminal device on the uplink resource, and the ACK or NACK is sent by the terminal device according to the first parameter of the sidelink data and the corresponding relationship.

In the case of receiving the NACK, the network device allocates the sidelink resource to the terminal device; optionally, the sidelink resource is used to retransmit the sidelink data. Optionally, the network device further allocates the uplink resource to the terminal device; and in the case of receiving the ACK, the network device terminates the allocation of retransmission resource of the sidelink data to the terminal device.

To sum up, in the method provided in this embodiment, the terminal device sends ACK or NACK to the network device on the uplink resource according to the first parameter of the sidelink data and the corresponding relationship, so that in the case that the number of transmissions of the sidelink data does not reach the maximum number of transmissions, the network device is continuously requested to allocate the retransmission resource of the sidelink data, so as to realize that the sidelink data of different importance levels realizes different times of repeated transmissions, and improve the transmission success rate of the sidelink data that does not require sidelink feedback.

Figure 11:
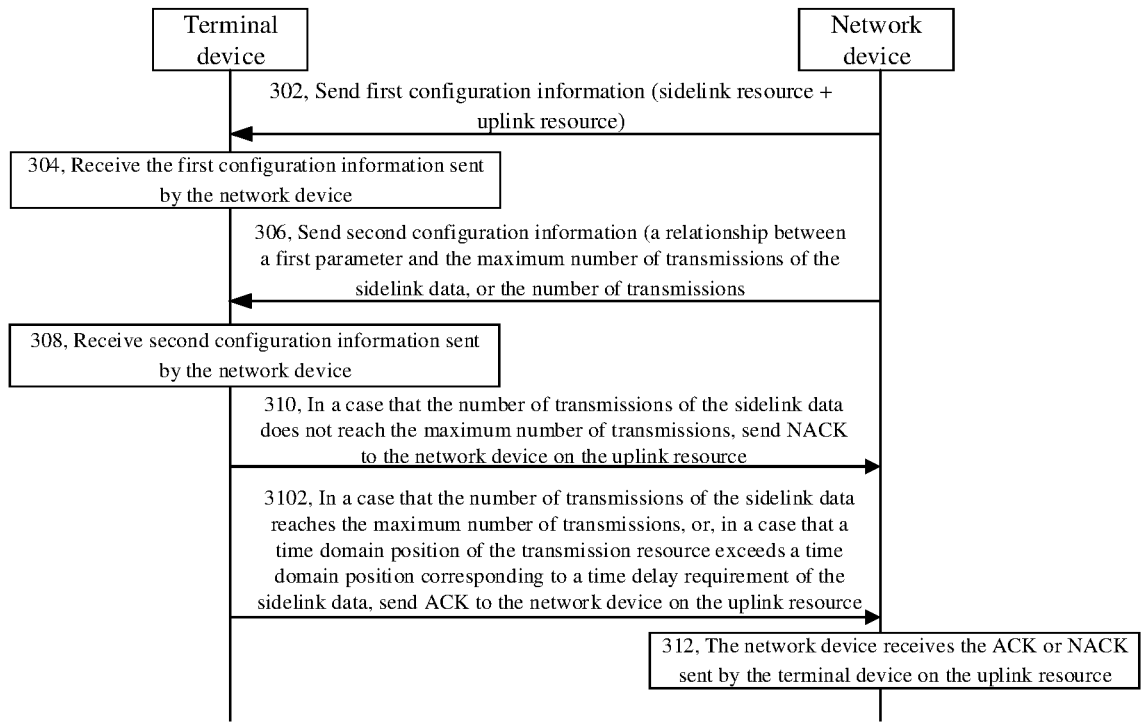
FIG. 11 is a flowchart of a method for sending information provided by an exemplary embodiment of the present application.

With reference to FIG. 10, during the allocation process of the initial transmission resource and the allocation process of subsequent multiple retransmission resources, the sidelink resource and/or uplink resource allocated by the network device may not meet the delay requirement of sidelink data. The above-mentioned step 310 may be alternatively implemented as the following sub-steps, as shown in FIG. 11. The method includes the following steps.

In step 310-1, when the number of transmissions of the sidelink data does not reach the maximum number of transmissions, the terminal device sends an NACK to the network device on the uplink resource.

In step 310-2, when the number of transmissions of the sidelink data reaches the maximum number of transmissions, or, in the case where the time domain position of the transmission resource exceeds the time domain position corresponding to the time delay requirement of the sidelink data, the terminal device sends an ACK to the network device on the uplink resource.

When the number of transmissions of sidelink data reaches the maximum number of transmissions, the terminal device sends an ACK to the network device on the uplink resource.

Or, when the time domain position of the sidelink resource exceeds the time domain position corresponding to the time delay requirement of the sidelink data, the terminal device sends an ACK to the network device on the uplink resource.

Or, when the time domain position of the uplink resource exceeds the time domain position corresponding to the time delay requirement of the sidelink data, the terminal device sends an ACK to the network device on the uplink resource.

Or, when the time domain positions of the sidelink resource and the uplink resource exceed the time domain position corresponding to the time delay requirement of the sidelink data, the terminal device sends an ACK to the network device on the uplink resource.

Taking the sidelink data being sidelink data requiring sidelink feedback as an example, the following embodiments are provided.

Figure 12:
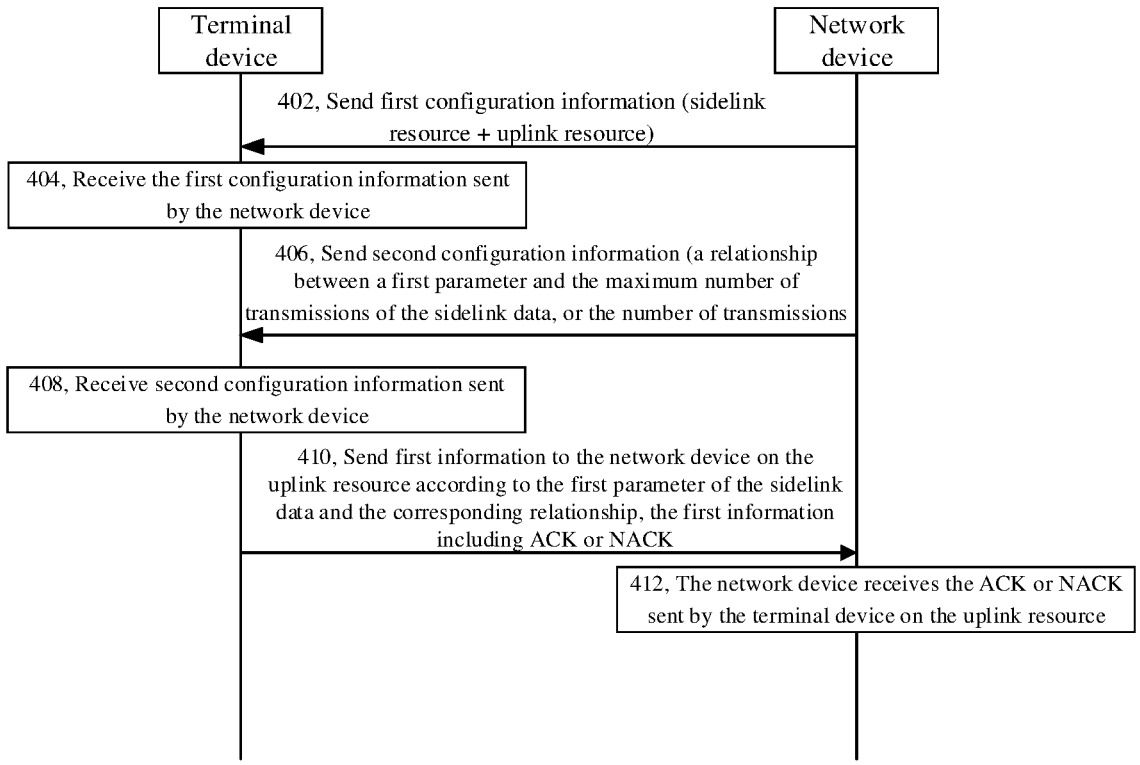
FIG. 12 is a flowchart of a method for sending information provided by an exemplary embodiment of the present application.

FIG. 12 shows a flowchart of a method for sending information provided by an exemplary embodiment of the present application. This embodiment is illustrated by taking the method applied to the communication system shown in FIG. 7 as an example. The method includes the following steps.

In step 402, the network device sends first configuration information to the terminal device, where the first configuration information is used to allocate the sidelink resource and the uplink resource for the terminal device, and the sidelink resource is used to send sidelink data of the terminal device.

In an example, when there is sidelink data that needs to be sent in the terminal device, the terminal device sends the SR or BSR to the network device. The network device receives the SR or BSR sent by the terminal device, and allocates the transmission resource to the terminal device according to the SR or BSR.

Exemplarily, the transmission resource includes at least one of sidelink resource and uplink resource. In this embodiment, the transmission resource including the sidelink resource and the uplink resource is taken as an example for illustration. The sidelink resource is used for sending the initial transmission and/or retransmission of the sidelink data, and the uplink resource is used for sending the feedback (ACK or NACK) of the sidelink data. The sidelink data is the data that the terminal device decides to transmit on the sidelink resource, such as sidelink data that needs sidelink feedback.

In an example, the first configuration information is DCI, and the network device sends the DCI to the terminal device, where the DCI is used for allocating the sidelink resource and the uplink resource.

In an example, the first configuration information is a sidelink configured grant, and the network device sends a sidelink configured grant to the terminal device, where the sidelink configured grant is used for allocating the sidelink resource and the uplink resource.

Optionally, the uplink resource refers to a PUCCH resource.

In step 404, the terminal device receives first configuration information from the network device, where the first configuration information is used to allocate the sidelink resource and the uplink resource for the terminal device, and the sidelink resource is used to send sidelink data of the terminal device.

In an example, the terminal device receives the DCI sent by the network device, where the DCI is used to allocate the sidelink resource and the uplink resource.

In an example, the terminal device receives a sidelink configured grant sent by the network device, where the sidelink configured grant is used to allocate the sidelink resource and the uplink resource.

In step 406, the network device sends second configuration information to the terminal device, the second configuration information is used to configure a corresponding relationship, and the corresponding relationship includes: a relationship between the first parameter of the sidelink data and the maximum number of transmissions.

In an example, the second configuration information is RRC or SIB, and the network device sends the RRC or SIB to the terminal device to configure a corresponding relationship, where the corresponding relationship includes: a relationship between the first parameter of the sidelink data and the maximum number of transmissions. The maximum number of transmissions may be directly represented by numbers, or it may be represented by the maximum number of retransmissions. Among them, the maximum number of transmissions=1 initial transmission+the maximum number of retransmissions.

Optionally, the corresponding relationship includes a relationship between the first parameter of the sidelink data and the maximum number of retransmissions.

Optionally, the first parameter of the sidelink data includes: a parameter related to a quality of service attribute; and/or, a logical channel of the sidelink data.

Optionally, the above-mentioned corresponding relationship may also be pre-configured, that is, the corresponding relationship is pre-configured in the terminal device.

Optionally, in another possible implementation manner, the network device sends second configuration information to the terminal device, where the second configuration information is used to determine the number of transmissions of the sidelink data (including the maximum number of transmissions or the remaining number of transmissions). The terminal device may determine the remaining number of transmissions of the sidelink data according to the second configuration information. Further, the terminal device may determine the remaining number of transmissions of the sidelink data according to the difference between the maximum number of transmissions of the sidelink data and the number of times that have been transmitted; or, directly determine the remaining number of transmissions of the sidelink data from the second configuration information. Optionally, the second configuration information is carried in DCI or RRC signaling. Optionally, the first configuration information and the second configuration information are carried in the same configuration signaling.

For example, the network device sends RRC signaling to the terminal to configure the sidelink resource and the uplink resource, and the RRC signaling includes first indication information, where the indication information is used to indicate the maximum number of transmissions (or maximum number of retransmissions) of sidelink data. The terminal receives the RRC signaling, transmits the sidelink data on the sidelink resource allocated by the RRC signaling, and may determine the maximum number of transmissions of the sidelink data according to the first indication information.

For another example, the network sends DCI signaling to the terminal, where the DCI signaling is used to configure the sidelink resource and the uplink resource, and the DCI signaling includes second indication information, where the second indication information is used to indicate the maximum number of transmissions, or the maximum number of retransmissions, or the number of remaining transmissions of the sidelink data. The terminal receives the DCI signaling, transmits the sidelink data on the sidelink resource allocated by the DCI signaling, and may determine the maximum number of transmissions or remaining number of transmissions of the sidelink data according to the second indication information.

It should be noted that this embodiment does not limit the order of execution of the first configuration information and the second configuration information, step 404 may be executed before step 406, step 406 may be executed before step 404, or both are executed simultaneously.

In step 408, the terminal device receives the second configuration information from the network device, the second configuration information is used to configure the corresponding relationship or the number of times of transmission of the sidelink data, and the corresponding relationship includes: a relationship between the first parameter of the sidelink data and the maximum number of transmissions.

Optionally, the first parameter of the sidelink data includes: a parameter related to a quality of service attribute; and/or, a logical channel of the sidelink data.

In step 410, the terminal device sends the first information to the network device on the uplink resource according to the first parameter of the sidelink data and the corresponding relationship (and the received sidelink feedback information), and the first information includes ACK or NACK.

The terminal device transmits the first sidelink data on the sidelink resource allocated by the network, and the terminal device determines the maximum number of transmissions of the first sidelink data according to the first parameter of the first sidelink data and the corresponding relationship shown in Table 1 (or Table 2).

In another possible implementation manner, the terminal device determines the maximum number of times of transmission (or the number of retransmissions) of sidelink data according to the second configuration information.

When the number of transmissions of the sidelink data does not reach the maximum number of transmissions, the terminal device sends first information to the network device on the uplink resource. The first information is determined according to the sidelink feedback information received by the terminal device. The first information includes ACK or NACK. Illustratively, when the sidelink feedback information received by the terminal device is ACK, the ACK is sent to the network device on the uplink resource; when the sidelink feedback information received by the terminal device is NACK, the NACK is sent to the network device on the uplink resource; when the determining result of the terminal device is DTX, where DTX means that the sending end does not receive the sidelink feedback information sent by the receiving end or does not detect the sidelink feedback channel sent by the receiving end, NACK is sent to the network device on the uplink resource.

When the number of transmissions of the sidelink data reaches the maximum number of transmissions, the terminal device sends an ACK to the network device on the uplink resource.

In step 412, the network device receives the ACK or NACK sent by the terminal device on the uplink resource, and the ACK or NACK is sent by the terminal device according to the first parameter of the sidelink data and the corresponding relationship.

In the case of receiving the NACK, the network device allocates the sidelink resource to the terminal device; optionally, the sidelink resource is used to retransmit the sidelink data. Optionally, the network device further allocates the uplink resource to the terminal device. In the case of receiving the ACK, the network device terminates the allocation of retransmission resource of the sidelink data to the terminal device.

Optionally, the ACK or NACK is sent by the terminal device according to the sidelink feedback information received by the terminal device when the number of transmissions of the sidelink data does not reach the maximum number of transmissions. The maximum number of retransmissions is determined by the terminal device according to the first parameter of the sidelink data and the corresponding relationship. Or, the ACK is sent by the terminal device when the number of retransmissions of the sidelink data reaches the maximum number of retransmissions of the sidelink data, and the maximum number of retransmissions is determined by the terminal device according to the first parameter of the sidelink data and the corresponding relationship.

To sum up, in the method provided in the present embodiment, the terminal device sends ACK or NACK to the network device on the uplink resource according to the first parameter of the sidelink data and the corresponding relationship, in the case that the number of transmissions of the sidelink data does not reach the maximum number of transmissions, the network device is continuously requested to allocate the retransmission resource of the sidelink data, so as to realize that the sidelink data of different importance levels realizes different times of repeated transmissions, and improve the transmission success rate of the sidelink data that does not require sidelink feedback.

Figure 13:
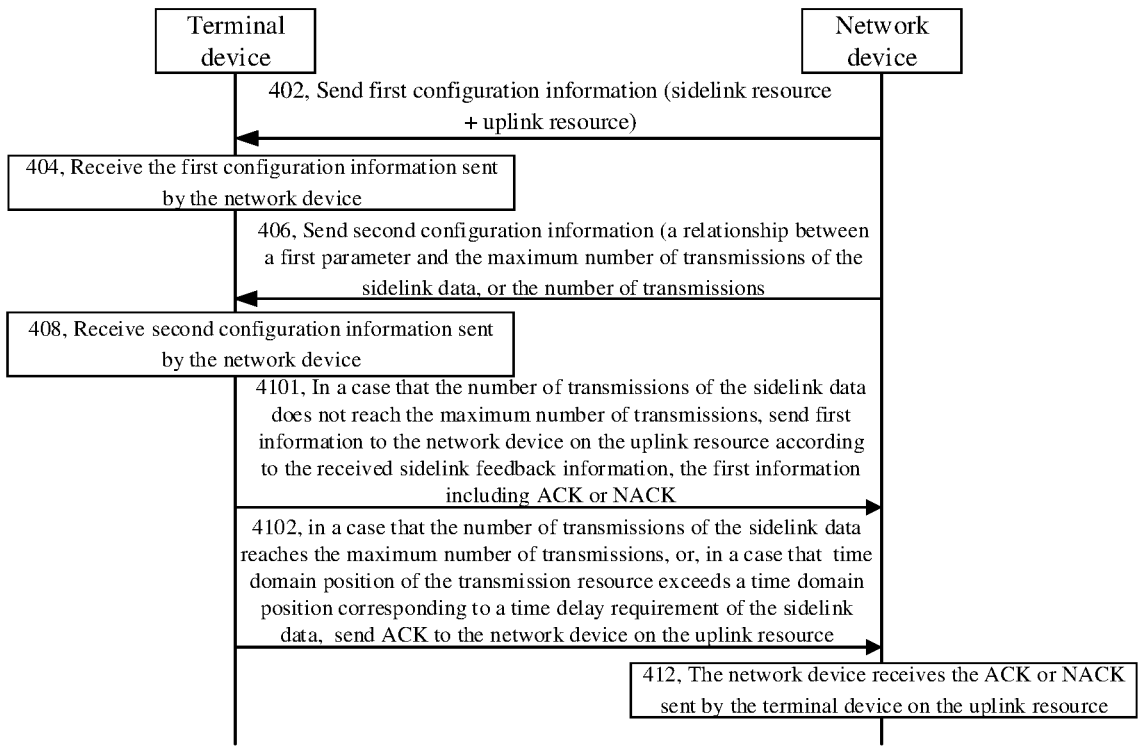
FIG. 13 is a flowchart of a method for sending information provided by an exemplary embodiment of the present application.

With reference to FIG. 12, during the allocation process of initial transmission resource and the allocation process of subsequent multiple retransmission resources, the sidelink resource and/or uplink resource allocated by the network device may not meet the delay requirement of sidelink data. The above step 410 may be alternatively implemented as the following sub-steps, as shown in FIG. 13. The method includes the following steps.

In step 410-1, in the case where the number of transmissions of the sidelink data does not reach the maximum number of transmissions, the terminal device sends first information to the network device on the uplink resource according to the received sidelink feedback information, and the first information includes ACK or NACK.

Illustratively, when the sidelink feedback information received by the terminal device is ACK, the ACK is sent to the network device on the uplink resource; when the sidelink feedback information received by the terminal device is NACK, the NACK is sent to the network device on the uplink resource; when the determining result of the terminal device is DTX, where DTX means that the sending end does not receive the sidelink feedback information sent by the receiving end or does not detect the sidelink feedback channel sent by the receiver, NACK is sent to the network device on the uplink resource.

In step 410-2, when the number of transmissions of the sidelink data reaches the maximum number of transmissions, or, when the time domain position of the transmission resource exceeds the time domain position corresponding to the time delay requirement of the sidelink data, the terminal device sends an ACK to the network device on the uplink resource.

When the number of transmissions of sidelink data reaches the maximum number of transmissions, the terminal device sends an ACK to the network device on the uplink resource;

or, when the time domain position of the sidelink resource exceeds the time domain position corresponding to the time delay requirement of the sidelink data, the terminal device sends an ACK to the network device on the uplink resource;

or, when the time domain position of the uplink resource exceeds the time domain position corresponding to the time delay requirement of the sidelink data, the terminal device sends an ACK to the network device on the uplink resource;

or, when the time domain positions of the sidelink resource and the uplink resource exceed the time domain position corresponding to the time delay requirement of the sidelink data, the terminal device sends an ACK to the network device on the uplink resource.

Figure 14:
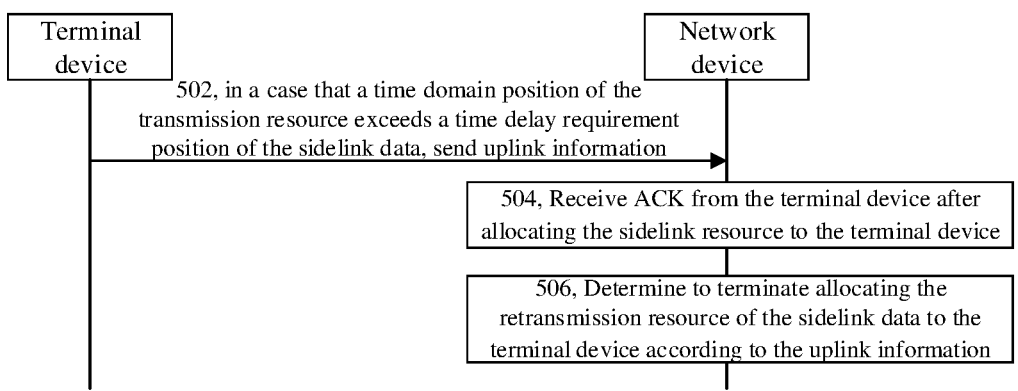
FIG. 14 is a flowchart of a method for sending information provided by an exemplary embodiment of the present application.

FIG. 14 shows a flowchart of a method for sending information provided by an exemplary embodiment of the present application. This embodiment is illustrated by taking the method applied to the communication system shown in FIG. 7 as an example. The method includes the following steps.

In step 502, when the time domain position of the transmission resource exceeds the time domain position corresponding to the time delay requirement of the sidelink data, the terminal device sends an ACK to the network device.

The terminal device determines that the time domain position of the transmission resource exceeds the time domain position corresponding to the time delay requirement of the sidelink data, and sends the uplink information to the network device. The uplink information is used to terminate the network device to allocate the retransmission resource of the sidelink data to the terminal device.

The transmission resource is a resource allocated by the network device to the terminal device. The transmission resource includes at least one of a sidelink resource and an uplink resource. The sidelink resource is used for sending the initial transmission and/or retransmission of the sidelink data, and the uplink resource is used for sending the feedback (ACK or NACK) of the sidelink data. The sidelink data is the data that the terminal device decides to transmit on the sidelink resource.

The time domain position corresponding to the time delay requirement refers to the time indicated by "the service arrival time of the sidelink data+the time delay requirement".

Optionally, the ACK is uplink information carried on the uplink resource, and the uplink resource may be the resource on the PUCCH. The uplink information is information corresponding to the sidelink resource, for example, the time interval between the PUCCH transmission resource and the sidelink transmission resource is determined according to the network configuration information.

Optionally, the uplink resource used to carry the uplink information is allocated by the network device to the terminal device.

In step 504, the network device receives the ACK from the terminal device.

In step 506, the network device terminates the allocation of retransmission resource of the sidelink data to the terminal device according to the uplink information.

After receiving the uplink information corresponding to the sidelink resource, the network device terminates allocating the retransmission resource of the sidelink data to the terminal device.

Figure 15:
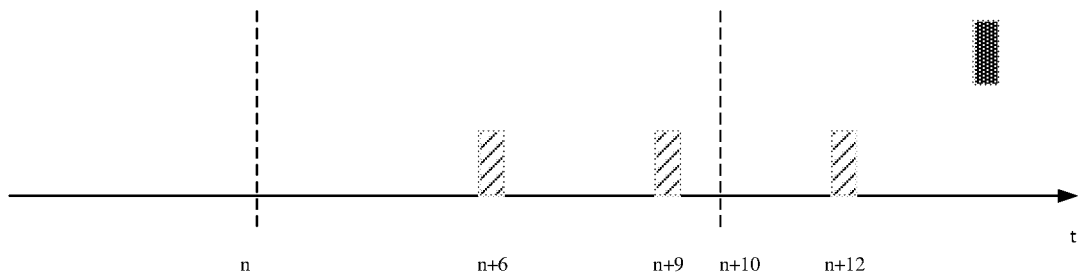
FIG. 15 is a schematic diagram of a method for sending information provided by an exemplary embodiment of the present application.

Referring to FIG. 15 exemplarily, at time n, the terminal device A has sidelink data arriving and needs to transmit the sidelink data. Assuming that the delay requirement corresponding to the sidelink data is 10 milliseconds (ms), that is, the Packet Delay Budget (PDB) of the sidelink data is 10 ms, terminal device A sends an SR/BSR to the network device to apply for the sidelink resource, the network device allocates 3 sidelink resources and 1 PUCCH resource to terminal device A, and the time domain positions of the 3 sidelink resources correspond to (n+6) ms, (n+9) ms and (n+12) ms respectively. Terminal device A uses the first sidelink resource (n+6) ms to send the initial transmission of the sidelink data, and uses the second sidelink resource (n+9) ms to send the retransmission of the sidelink data. If terminal device A receives the NACK sent by terminal device B, terminal device A should send a retransmission of the sidelink data, but because the time domain position of the third sidelink resource (n+12) ms has exceeded the delay requirement of the sidelink data, terminal device A will not use the sidelink resource (n+12) ms to send the retransmission, but report uplink information to the network device on the PUCCH resource to stop the network device from scheduling the retransmission resource for terminal device A.

Figure 16:
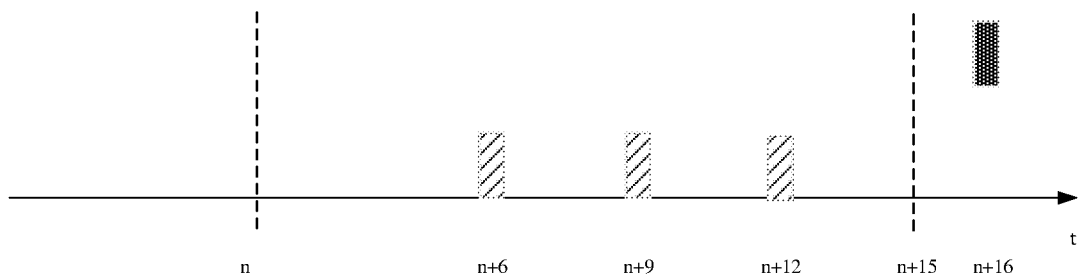
FIG. 16 is a schematic diagram of a method for sending information provided by an exemplary embodiment of the present application.

Referring to FIG. 16 exemplarily, at time n, terminal device A has sidelink data arriving and needs to transmit the sidelink data. Assuming that the delay requirement corresponding to the sidelink data is 15 milliseconds (ms), that is, the Packet Delay Budget (PDB) of the sidelink data is 15 ms, terminal device A sends an SR/BSR to the network device to apply for the sidelink resource, the network device allocates 3 sidelink resources and 1 PUCCH resource to terminal device A, and the time domain positions of the 3 sidelink resources correspond to (n+6) ms, (n+9) ms and (n+12) ms respectively, and the time domain position of the PUCCH resource corresponds to (n+16) ms. Terminal device A uses the first sidelink resource (n+6) ms to send the initial transmission of the sidelink data, and uses the second sidelink resource (n+9) ms and the third sidelink resource (n+12) ms to send retransmission of the sidelink data. If terminal device A receives NACK sent by terminal device B, terminal device A should send a retransmission of the sidelink data, but since the time domain position of the PUCCH resource has exceeded the delay requirement of the sidelink data, even if the retransmission resource is allocated again, which is an invalid retransmission resource. Therefore, terminal device A does not use the PUCCH resource to report NACK to the network device, but uses the PUCCH resource to report uplink information to the network device, so as to stop the network device from scheduling the retransmission resource for the terminal device A.

To sum up, in the method for sending information provided in this embodiment, when the time domain position of the transmission resource exceeds the time domain position corresponding to the time delay requirement of the sidelink data, the terminal device sends the uplink information to the network device, and the uplink information is used to terminate the network device's allocation of retransmission resource of the sidelink data to the terminal device, so that when the sidelink resource allocated by the network device does not meet the service delay requirement, there is no need to continue to allocate the retransmission resource to the terminal device, thereby avoiding invalid allocation of the retransmission resource, and reducing the waste of the communication resource.

Taking the sidelink data being sidelink data requiring sidelink feedback as an example, the following embodiments are also provided.

Figure 17:
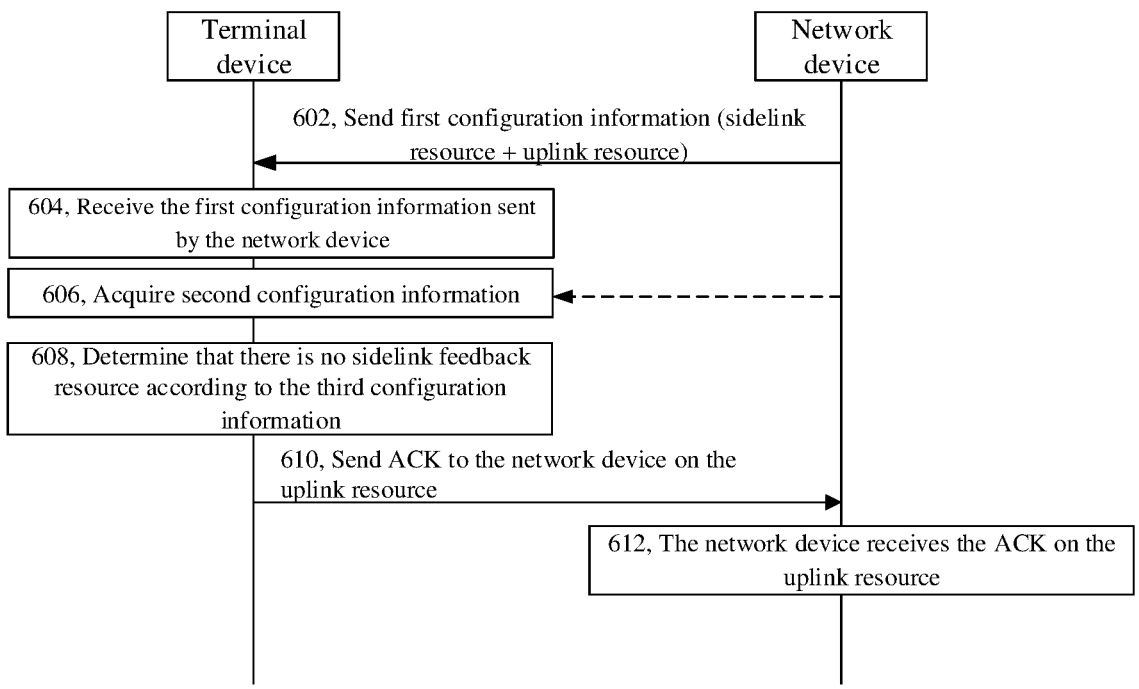
FIG. 17 is a schematic diagram of a method for sending information provided by an exemplary embodiment of the present application.

FIG. 17 shows a flowchart of a method for sending information provided by an exemplary embodiment of the present application. This embodiment is illustrated by taking the method applied to the communication system shown in FIG. 7 as an example. The method includes the following steps.

In step 602, the network device sends first configuration information to the terminal device, where the first configuration information is used to allocate the sidelink resource and the uplink resource for the terminal device, and the sidelink resource is used to send sidelink data of the terminal device.

In an example, when there is sidelink data that needs to be sent in the terminal device, the terminal device sends the SR or BSR to the network device. The network device receives the SR or BSR sent by the terminal device, and allocates a transmission resource to the terminal device according to the SR or BSR.

Exemplarily, the transmission resource includes at least one of a sidelink resource and an uplink resource. In this embodiment, the transmission resource including the sidelink resource and the uplink resource is taken as an example for illustration. The sidelink resource is used for sending the initial transmission and/or retransmission of the sidelink data, and the uplink resource is used for sending the feedback (ACK or NACK) of the sidelink data. The sidelink data is the data that the terminal device decides to transmit on the sidelink resource, such as sidelink data that needs sidelink feedback.

In an example, the first configuration information is DCI, and the network device sends the DCI to the terminal device, where the DCI is used for allocating the sidelink resource and the uplink resource. In an example, the first configuration information is a sidelink configured grant, and the network device sends a sidelink configured grant to the terminal device, where the sidelink configured grant is used for allocating the sidelink resource and the uplink resource.

Optionally, the uplink resource refers to a PUCCH resource.

In step 604, the terminal device receives the first configuration information from the network device.

In an example, the terminal device receives the DCI sent by the network device, where the DCI is used to allocate the sidelink resource and the uplink resource.

In one example, the terminal device receives a sidelink configured grant sent by the network device, where the sidelink configured grant is used to allocate the sidelink resource and the uplink resource.

Optionally, the sidelink data requires sidelink feedback. The terminal device determines, according to the logical channel corresponding to the sidelink data, that the sidelink data needs sidelink feedback. Illustratively, the terminal device determines, according to information such as an attribute or parameter corresponding to the logical channel, that the logical channel corresponding to the sidelink data needs sidelink feedback.

In step 606, the terminal device acquires third configuration information.

The third configuration information is used to determine that there is no sidelink feedback resource, and the sidelink feedback resource is a resource used to feed back the reception situation of the sidelink data, such as a resource used to transmit the PSFCH. Optionally, the third configuration information is configured based on a resource pool, or configured based on a terminal. Taking the third configuration information being configured based on the resource pool as an example, there is no corresponding sidelink feedback resource for the sidelink resource in the entire resource pool.

Optionally, the third configuration information is preconfigured. Or, the third configuration information is configured by the network device to the terminal device. That is, the network device sends the third configuration information to the terminal device, and the terminal receives the third configuration information from the network device, where the third configuration information is DCI or RRC or SIB.

In step 608, the terminal device determines according to the third configuration information that there is no sidelink feedback resource.

In step 610, the terminal device sends an ACK to the network device on the uplink resource.

In step 612, the network device receives the ACK on the uplink resource.

After receiving the ACK, the network device stops allocating the retransmission resource of the sidelink data to the terminal device.

To sum up, in the method provided in this embodiment, when the terminal device determines that there is no sidelink feedback resource according to the third configuration information, an ACK is sent to the network device on the uplink resource, so that the network device does not need to continue to allocate the retransmission resource to the terminal device, thereby avoiding the allocation of invalid retransmission resource and reducing the waste of communication resources.

It should be noted that, this embodiment may also be implemented in combination with the embodiment shown in FIG. 12 or FIG. 13.

It should be noted that, the steps performed by the terminal device in the above embodiments can be independently implemented as a method for sending information on the terminal device side; the steps performed by the network device can be implemented independently as a method for receiving information on the network device side.

It should be noted that, the above embodiments can also be freely combined into new embodiments according to the understanding of those skilled in the art.

It should be noted that the above sidelink data may be multiple, each sidelink data corresponds to a different transmission resource, each transmission resource corresponds to a different ACK or NACK, and different ACKs or NACKs may use "first, second" to be distinguished from each other.

Figure 18:
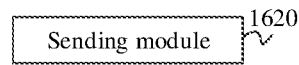
FIG. 18 is a structural block diagram of an apparatus for sending information provided by an exemplary embodiment of the present application.

FIG. 18 shows a block diagram of an apparatus for sending information provided by an exemplary embodiment of the present application. The apparatus may be implemented as a terminal device, or implemented as a part of the terminal device, and the apparatus includes:

a sending module 1620, configured to send an NACK to the network device on the uplink resource when the sidelink data transmitted on the sidelink resource does not require sidelink feedback.

In an optional embodiment, the sending module 1620 is further configured to, in the case that the time domain position of the sidelink resource exceeds the time domain position corresponding to the delay requirement of the sidelink data, send an ACK to the network device on the uplink resource;

and/or, the sending module 1620 is further configured to, in the case that the time domain position of the uplink resource exceeds the time domain position corresponding to the delay requirement of the sidelink data, send the ACK to the network device on the uplink resource.

In an optional embodiment, the sidelink resource is allocated by the network device to the terminal device through DCI.

In an optional embodiment, the sidelink resource is a transmission resource of a sidelink configured grant allocated by the network device to the terminal device.

Figure 19:
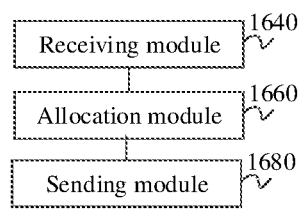
FIG. 19 is a structural block diagram of an apparatus for receiving information provided by an exemplary embodiment of the present application.

FIG. 19 shows a block diagram of an apparatus for receiving information provided by an exemplary embodiment of the present application. The apparatus may be implemented as a network device, or implemented as a part of the network device, and the device includes:

a receiving module 1640, configured to receive an NACK sent by the terminal device on the uplink resource, where the NACK is sent when the sidelink data transmitted by the terminal device on the sidelink resource does not require sidelink feedback;

an allocation module 1660, configured to allocate a retransmission resource of the sidelink data to the terminal device according to the NACK.

In an optional embodiment, the receiving module 1640 is further configured to receive an ACK sent by the terminal device, where the ACK is sent by the terminal device in a case that time domain positions of the sidelink resource and/or the uplink resource exceed a time domain position corresponding to a time delay requirement of the sidelink data; and the allocation module 1660 is further configured to terminate allocating the retransmission resource of the sidelink data to the terminal device according to the ACK.

In an optional embodiment, the sending module 1680 is configured to send DCI to the terminal device, where the DCI is used to allocate the sidelink resource.

In an optional embodiment, the sending module 1680 is configured to send a sidelink configured grant to the terminal device, where the sidelink configured grant is used to allocate the sidelink resource.

Figure 20:
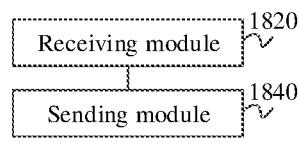
FIG. 20 is a structural block diagram of an apparatus for sending information provided by an exemplary embodiment of the present application.

FIG. 20 shows a block diagram of an apparatus for sending information provided by an exemplary embodiment of the present application. The apparatus may be implemented as a terminal device, or implemented as a part of the terminal device, and the apparatus includes:

a receiving module 1820, configured to receive first configuration information from a network device, where the first configuration information is used to allocate a sidelink resource and an uplink resource to the apparatus, and the sidelink resource is used to send the sidelink data of the apparatus;

where the receiving module 1820 is further configured to receive second configuration information from the network device, where the second configuration information is used to configure a corresponding relationship, and the corresponding relationship includes: a relationship between a first parameter of the sidelink data and a maximum number of transmissions; or, the second configuration information is used to configure the number of transmissions of sidelink data (the maximum number of transmissions or the maximum number of retransmissions or the remaining number of transmissions or the remaining number of retransmissions).

The sending module 1840 is configured to send ACK or NACK to the network device on the uplink resource according to the first parameter of the sidelink data and the corresponding relationship.

In an optional embodiment, the sidelink data does not require sidelink feedback, and the sending module 1840 is configured to: determine the maximum number of transmissions of the sidelink data according to the first parameter of the sidelink data and the corresponding relationship; in the case that the number of transmissions of the sidelink data does not reach the maximum number of transmissions, send the NACK to the network device on the uplink resource. The sending module 1840 is configured to: determine the maximum number of transmissions of the sidelink data according to the first parameter of the sidelink data and the corresponding relationship; in the case that the number of times of transmission of the sidelink data reaches the maximum number of transmissions, send the ACK to the network device on the uplink resource.

In an optional embodiment, the sidelink data needs sidelink feedback, and the sending module 1840 is configured to: determine the maximum number of transmissions of the sidelink data according to the first parameter of the sidelink data and the corresponding relationship; in the case that the number of transmissions of the sidelink data does not reach the maximum number of transmissions, send first information to the network device on the uplink resource, where the first information is determined based on the sidelink feedback information received by the terminal device, and the first information includes the ACK or the NACK. The sending module 1840 is configured to: determine the maximum number of transmissions of the sidelink data according to the first parameter of the sidelink data and the corresponding relationship; and in the case that the number of times of transmission of the sidelink data reaches the maximum number of transmissions, send the ACK sent to the network device on the uplink resource.

In an optional embodiment, the sending module 1840 is configured to, in the case that the time domain position of the sidelink resource exceeds the time domain position corresponding to the delay requirement of the sidelink data, send the ACK to the network device on the uplink resource; and/or, the sending module 1880 is configured to, in the case that the time domain position of the uplink resource exceeds the time domain position corresponding to the time delay requirement of the sidelink data, send the ACK to the network device on the uplink resource.

In an optional embodiment, the first configuration information is downlink control information (DCI); or, the first configuration information is a sidelink configured grant.

In an optional embodiment, the second configuration information is radio resource control (RRC) signaling; or, the second configuration information is a system information block (SIB); or, the second configuration information is pre-configuration information.

In an optional embodiment, the first parameter of the sidelink data includes: a parameter related to a quality of service attribute; and/or, the first parameter of the sidelink data includes: a logical channel of the sidelink data.

Figure 21:
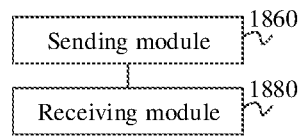
FIG. 21 is a structural block diagram of an apparatus for receiving information provided by an exemplary embodiment of the present application.

FIG. 21 shows a block diagram of an apparatus for receiving information provided by an exemplary embodiment of the present application. The apparatus may be implemented as a network device, or implemented as a part of the network device, and the device includes:

a sending module 1860, configured to send first configuration information to the terminal device, where the first configuration information is used to allocate a sidelink resource and an uplink resource for the terminal device, and the sidelink resource is used to send a sidelink resource of the terminal device;

where the sending module 1860 is further configured to send second configuration information to the terminal device, where the second configuration information is used to configure a corresponding relationship, and the corresponding relationship includes: a relationship between a first parameter of the sidelink data and a maximum number of transmissions; or, the second configuration information is used to configure the transmission times of the sidelink data (the maximum transmission times or the maximum retransmission times or the remaining transmission times or the remaining retransmission times).

The receiving module 1880 is configured to receive an acknowledgment (ACK) or a negative acknowledgment (NACK) sent by the terminal device on the uplink resource, where the acknowledgment (ACK) or the negative acknowledgment (NACK) is sent by the terminal device according to the first parameter of the sidelink data and the corresponding relationship.

In an optional embodiment, the sidelink data does not require sidelink feedback, and the NACK is sent by the terminal device in the case that the number of retransmissions of the sidelink data does not reach the maximum number of retransmissions of the sidelink data. The maximum number of retransmissions is determined by the terminal device according to the first parameter of the sidelink data and the corresponding relationship.

In an optional embodiment, the sidelink data requires sidelink feedback, and the ACK or the NACK is sent by the terminal device according to the sidelink feedback information received by the terminal device in the case that the number of transmissions of the sidelink data does not reach the maximum number of transmissions.

In an optional embodiment, the sidelink data does not require sidelink feedback, or the sidelink data requires sidelink feedback, the ACK is sent by the terminal device in the case that the number of retransmissions of the sidelink data reaches the maximum number of retransmissions of the sidelink data, where the maximum number of retransmissions is determined by the terminal device according to the first parameter of the sidelink data and the corresponding relationship.

In an optional embodiment, the sidelink data does not require sidelink feedback, or the sidelink data requires sidelink feedback, the receiving module 1880 is further configured to receive the ACK sent by the terminal device, where the ACK is sent by the terminal device when the time domain positions of the sidelink resource and/or the uplink resource exceeds the time domain position corresponding to the time delay requirement of the sidelink data.

In an optional embodiment, the first configuration information is downlink control information (DCI); or, the first configuration information is a sidelink configured grant.

In an optional embodiment, the second configuration information is radio resource control (RRC) signaling; or, the second configuration information is a system information block (SIB); or, the second configuration information is pre-configuration information.

In an optional embodiment, the first parameter of the sidelink data includes: a parameter related to a quality of service attribute; and/or, the first parameter of the sidelink data includes: a logical channel of the sidelink data.

Figure 22:
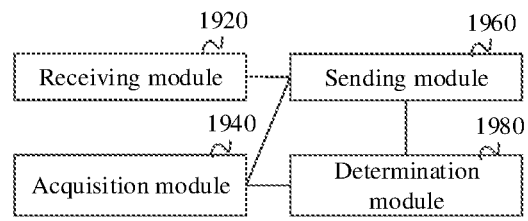
FIG. 22 is a structural block diagram of an apparatus for sending information provided by an exemplary embodiment of the present application.

FIG. 22 shows a block diagram of an apparatus for sending information provided by an exemplary embodiment of the present application. The apparatus may be implemented as a terminal device, or implemented as a part of the terminal device, and the apparatus includes:

a receiving module 1920, configured to receive first configuration information from a network device, where the first configuration information is used to allocate a sidelink resource and an uplink resource for the terminal device, and the sidelink resource is used to send sidelink data of the terminal device;

an acquisition module 1940, configured to acquire third configuration information, and determine according to the third configuration information that there is no sidelink feedback resource;

a sending module 1960, configured to send an acknowledgment (ACK) to the network device on the uplink resource.

In an optional embodiment, the sidelink data requires sidelink feedback.

In an optional embodiment, the apparatus further includes:

a determination module 1980, configured to determine, according to the logical channel corresponding to the sidelink data, that the sidelink data needs sidelink feedback.

In an optional embodiment, the apparatus further includes:

the acquisition module 1940, configured to acquire second configuration information, where the second configuration information is used to configure a corresponding relationship, and the corresponding relationship includes: a relationship between the first parameter of the sidelink data and the maximum number of transmissions;

a determination module 1980, configured to determine the maximum number of transmission of the sidelink data according to the first parameter of the sidelink data and the corresponding relationship;

the sending module 1960, configured to send the ACK to the network device on the uplink resource when the number of transmissions of the sidelink data reaches the maximum number of transmissions.

In an optional embodiment, the first parameter of the sidelink data includes at least one of the following parameters:

a parameter related to quality of service attributes;
a logical channel of the sidelink data.

In an optional embodiment, the third configuration information is RRC signaling; or, the third configuration information is DCI; or, the third configuration information is SIB; or, the third configuration information is preconfigured information.

In an optional embodiment, the second configuration information is RRC signaling; or, the second configuration information is SIB; or, the second configuration information is pre-configuration information.

In an optional embodiment, the first configuration information is DCI; or, the first configuration information is sidelink configured grant.

Figure 23:
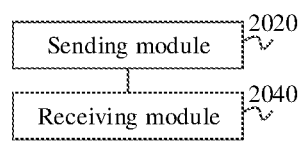
FIG. 23 is a structural block diagram of an apparatus for receiving information provided by an exemplary embodiment of the present application.

FIG. 23 shows a block diagram of an apparatus for receiving information provided by an exemplary embodiment of the present application. The apparatus may be implemented as a network device, or implemented as a part of the network device, and the apparatus includes:

a sending module 2020, configured to send first configuration information to a terminal device, where the first configuration information is used to allocate a sidelink resource and an uplink resource for the terminal device, and the sidelink resource is used to send sidelink data of the terminal device;

a receiving module 2040, configured to receive an ACK sent by the terminal device on the uplink resource, where the ACK is sent when the terminal device determines that there is no sidelink feedback resource according to the third configuration information.

In an optional embodiment, the sending module 2020 is further configured to send the third configuration information to the terminal device.

In an optional embodiment, the sending module 2020 is further configured to send second configuration information to the terminal device, where the second configuration information is used to configure a corresponding relationship, and the corresponding relationship includes: a relationship between the first parameter of the sidelink data and the maximum number of transmissions.

The receiving module 2040 is further configured to receive an ACK sent by the terminal device on the uplink resource, where the ACK is sent by the terminal device when the number of retransmissions of the sidelink data reaches the maximum number of retransmissions of the sidelink data. The maximum number of retransmissions is determined by the terminal device according to the first parameter of the sidelink data and the corresponding relationship.

In an optional embodiment, the first parameter of the sidelink data includes at least one of the following parameters: a parameter related to a quality of service attribute; and a logical channel of the sidelink data.

In an optional embodiment, the third configuration information is RRC signaling; or, the third configuration information is DCI; or, the third configuration information is SIB. In an optional embodiment, the second configuration information is RRC signaling; or, the second configuration information is SIB; or, the second configuration information is pre-configuration information. In an optional embodiment, the first configuration information is DCI; or, the first configuration information is a sidelink configured grant.

Figure 24:
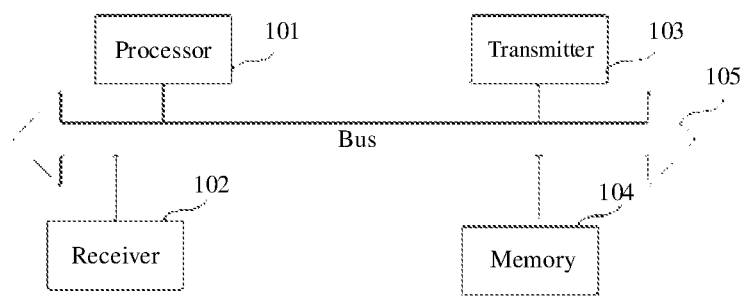
FIG. 24 is a schematic diagram of an exemplary configuration of a communication device provided by the present application.

FIG. 24 shows a schematic structural diagram of a communication device (network device or terminal device) provided by an exemplary embodiment of the present application. The communication device includes: a processor 101, a receiver 102, a transmitter 103, a memory 104, and a bus 105.

The processor 101 includes one or more processing cores, and the processor 101 executes various functional applications and information processing by running software programs and modules.

The receiver 102 and the transmitter 103 may be implemented as one communication component, which may be one communication chip.

The memory 104 is connected to the processor 101 through the bus 105.

The memory 104 may be configured to store at least one instruction, and the processor 101 may be configured to execute the at least one instruction, so as to implement various steps in the foregoing method embodiments.

Additionally, the memory 104 may be implemented by any type or combination of volatile or non-volatile storage devices including, but not limited to, a magnetic or optical disk, an Erasable Programmable Read Only Memory (EEPROM), an Erasable Programmable Read Only Memory (EPROM), a Static Random Access Memory (SRAM), a Read-Only Memory (ROM), a magnetic memory, a flash memory, a Programmable Read-Only Memory (PROM).

In an exemplary embodiment, a computer-readable storage medium is also provided, where the computer-readable storage medium stores at least one instruction, at least one piece of program, a code set or an instruction set, the at least one instruction, the at least one piece of program, the code set or the instruction set is loaded and executed by the processor to implement the method for sending information executed by the terminal device or the method for receiving information executed by the network device provided by the above method embodiments.

Those of ordinary skill in the art can understand that all or part of the steps of implementing the above embodiments can be completed by hardware, or can be completed by instructing relevant hardware through a program, and the program can be stored in a computer-readable storage medium. The storage medium mentioned may be a read-only memory, a magnetic disk or an optical disk, etc.

The above are only optional embodiments of the present application, and are not intended to limit the present application. Any modifications, equivalent replacements, improvements, etc. made within the spirit and principles of the present application shall be included in the protection scope of the present application.

What is claimed is:

1. A method for sending information, applied to a terminal device, wherein the method comprises:
   receiving first configuration information from a network device, wherein the first configuration information is used for allocating a sidelink resource and an uplink resource for the terminal device, and the sidelink resource is used for sending sidelink data of the terminal device;
   acquiring second configuration information, wherein the second configuration information is used for configuring a corresponding relationship, and the corresponding relationship comprises: a relationship between a first parameter of the sidelink data and a maximum number of times of transmission; and
   sending an acknowledgement (ACK) or a negative acknowledgment (NACK) to the network device on the uplink resource according to the first parameter of the sidelink data and the corresponding relationship,
   wherein the sending the ACK or NACK to the network device on the uplink resource according to the first parameter of the sidelink data and the corresponding relationship, comprises:
   determining the maximum number of times of transmission of the sidelink data according to the first parameter of the sidelink data and the corresponding relationship; and
   in a case that the sidelink data needs a sidelink feedback and a number of times of transmission of the sidelink data does not reach the maximum number of times of transmission, sending first information to the network device on the uplink resource, wherein the first information is determined according to sidelink feedback information received by the terminal device, and the first information comprises the ACK or the NACK,
   wherein the first parameter of the sidelink data comprises a priority.

2. The method according to claim 1, wherein the sending the ACK or NACK to the network device on the uplink resource according to the first parameter of the sidelink data and the corresponding relationship, comprises:
   determining the maximum number of times of transmission of the sidelink data according to the first parameter of the sidelink data and the corresponding relationship; and
   in a case that the sidelink data does not need the sidelink feedback and the number of times of transmission of the sidelink data does not reach the maximum number of times of transmission, sending the NACK to the network device on the uplink resource.

3. The method according to claim 1, wherein the sending the acknowledgement (ACK) or the negative acknowledgment (NACK) to the network device on the uplink resource according to the first parameter of the sidelink data and the corresponding relationship, comprises:
   determining the maximum number of times of transmission of the sidelink data according to the first parameter of the sidelink data and the corresponding relationship; and
   in a case that the number of times of transmission of the sidelink data reaches the maximum number of times of transmission, sending the ACK to the network device on the uplink resource.

4. The method according to claim 1, wherein the method further comprises:
   in a case that a time domain position of the sidelink resource exceeds a time domain position corresponding to a delay requirement of the sidelink data, sending the ACK to the network device on the uplink resource; and/or, in a case that a time domain position of the uplink resource exceeds the time domain position corresponding to the delay requirement of the sidelink data, sending the ACK to the network device on the uplink resource.

5. The method according to claim 1, wherein the first configuration information is downlink control information (DCI); or, the first configuration information is a sidelink configured grant.

6. The method according to claim 1, wherein the second configuration information is a radio resource control (RRC) signaling.

7. A method for receiving information, applied to a network device, wherein the method comprises:
   sending first configuration information to a terminal device, wherein the first configuration information is used for allocating a sidelink resource and an uplink resource for the terminal device, and the sidelink resource is used for sending sidelink data of the terminal device;
   sending second configuration information to the terminal device, wherein the second configuration information is used for configuring a corresponding relationship, and the corresponding relationship comprises: a relationship between a first parameter of the sidelink data and a maximum number of times of transmission; and
   receiving an acknowledgment (ACK) or a negative acknowledgment (NACK) sent by the terminal device on the uplink resource, wherein the acknowledgment (ACK) or the negative acknowledgment (NACK) is sent by the terminal device according to the first parameter of the sidelink data and the corresponding relationship, wherein the ACK or the NACK is sent by the terminal device according to sidelink feedback information received by the terminal device in a case that the sidelink data needs a sidelink feedback and the number of times of transmission of the sidelink data does not reach the maximum number of times of transmission, wherein the maximum number of times of transmission is determined by the terminal device according to the first parameter of the sidelink data and the corresponding relationship, wherein the first parameter of the sidelink data comprises a priority.

8. The method according to claim 7, wherein the NACK is sent by the terminal device in a case that the sidelink data does not need the sidelink feedback and the number of times of transmission of the sidelink data does not reach the maximum number of times of transmission of the sidelink data, wherein the maximum number of times of transmission is determined by the terminal device according to the first parameter of the sidelink data and the corresponding relationship.

9. The method according to claim 7, wherein the ACK is sent by the terminal device in a case that the number of times of transmission of the sidelink data reaches the maximum number of times of transmission of the sidelink data, wherein the maximum number of times of transmission is determined by the terminal device according to the first parameter of the sidelink data and the corresponding relationship.

10. The method according to claim 7, wherein the method further comprises:

receiving the ACK sent by the terminal device, wherein the ACK is sent by the terminal device in a case that a time domain position of the sidelink resource and/or the uplink resource exceeds a time domain position corresponding to a delay requirement of the sidelink data.

11. The method according to claim 7, wherein the first configuration information is downlink control information (DCI); or, the first configuration information is a sidelink configured grant.

12. The method according to claim 7, wherein the second configuration information is a radio resource control (RRC) signaling.

13. An apparatus for sending information, wherein the apparatus comprises:

a processor;
a transceiver connected to the processor; and
a memory for storing executable instructions of the processor;

wherein the processor is configured to load and execute the executable instructions to:

receive first configuration information from a network device, wherein the first configuration information is used for allocating a sidelink resource and an uplink resource for the apparatus, and the sidelink resource is used for sending sidelink data of the apparatus;

acquire second configuration information, wherein the second configuration information is used for configuring a corresponding relationship, and the corresponding relationship comprises: a relationship between a first parameter of the sidelink data and a maximum number of times of transmission; and send an acknowledgement (ACK) or a negative acknowledgment (NACK) to the network device on the uplink resource according to the first parameter of the sidelink data and the corresponding relationship, wherein the processor is further configured to determine the maximum number of times of transmission of the sidelink data according to the first parameter of the sidelink data and the corresponding relationship; and in a case that the sidelink data needs a sidelink feedback and the number of times of transmission of the sidelink data does not reach the maximum number of times of transmission, send first information to the network device on the uplink resource, wherein the first information is determined according to sidelink feedback information received by a terminal device, and the first information comprises the ACK or NACK, wherein the first parameter of the sidelink data comprises a priority.

14. The apparatus according to claim 13, wherein the processor is further configured to determine the maximum number of times of transmission of the sidelink data according to the first parameter of the sidelink data and the corresponding relationship; and in a case that the sidelink data does not need the sidelink feedback and the number of times of transmission of the sidelink data does not reach the maximum number of times of transmission, send the NACK to the network device on the uplink resource.

15. The apparatus according to claim 13, wherein the processor is further configured to determine the maximum number of times of transmission of the sidelink data according to the first parameter of the sidelink data and the corresponding relationship; and in a case that the number of times of transmission of the sidelink data reaches the maximum number of times of transmission, send the ACK to the network device on the uplink resource.

* * * * *